(12) United States Patent
Yoshitani et al.

(10) Patent No.: US 7,807,330 B2
(45) Date of Patent: Oct. 5, 2010

(54) HEAT-SENSITIVE TRANSFER IMAGE-RECEIVING SHEET AND COATING COMPOSITION FOR FORMING HEAT-SENSITIVE TRANSFER IMAGE-RECEIVING SHEET

(75) Inventors: Toshihide Yoshitani, Minami-ashigara (JP); Takuya Arai, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 11/863,674

(22) Filed: Sep. 28, 2007

(65) Prior Publication Data

US 2008/0090178 A1 Apr. 17, 2008

(30) Foreign Application Priority Data

Sep. 29, 2006 (JP) .............................. 2006-269748

(51) Int. Cl.
*G03F 7/00* (2006.01)
*G03F 7/04* (2006.01)
*G03C 8/00* (2006.01)

(52) U.S. Cl. .................... 430/270.1; 430/200; 430/202; 430/905; 430/906; 430/944; 430/950

(58) Field of Classification Search .............. 430/270.1, 430/281.1, 271.1, 905, 906, 909, 944, 950, 430/202

See application file for complete search history.

(56) References Cited

U.S. PATENT DOCUMENTS 5,783,517 A 7/1998 Tomita et al.

6,660,688 B2 * 12/2003 Yamada et al. .............. 503/209
7,026,097 B2 * 4/2006 Hoshi et al. .............. 430/281.1

FOREIGN PATENT DOCUMENTS

| EP | 1518672 A2 * | 3/2005 |
| JP | 2-265789 | 10/1990 |
| JP | 8-224967 | 9/1996 |

* cited by examiner

*Primary Examiner*—Amanda C. Walke
(74) *Attorney, Agent, or Firm*—Sughrue Mion, PLLC

(57) ABSTRACT

A heat-sensitive transfer image-receiving sheet provided with at least one receptor layer on a support, wherein the receptor layer has a polymer containing a repeating unit derived from a monomer represented by formula (1); and a coating composition for forming the heat-sensitive transfer image-receiving sheet:

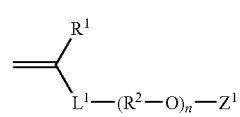

Formula (1)

wherein, $R^1$ represents a hydrogen atom, a halogen atom or a methyl group; $L^1$ represents a divalent linking group; $R^2$ represents an alkylene group having 1 to 5 carbon atoms which may be further substituted; n represents an integer of 1 to 40; $Z^1$ represents a hydrogen atom or a linear, branched or cyclic aliphatic hydrocarbon group having 1 to 30 carbon atoms which may be further substituted; and when n is 2 or more, $R^2$s may be the same or different.

17 Claims, No Drawings

HEAT-SENSITIVE TRANSFER IMAGE-RECEIVING SHEET AND COATING COMPOSITION FOR FORMING HEAT-SENSITIVE TRANSFER IMAGE-RECEIVING SHEET

FIELD OF THE INVENTION

The present invention relates to a heat-sensitive transfer image-receiving sheet and a coating composition for forming a heat-sensitive transfer image-receiving sheet. In particular, the present invention relates to a heat-sensitive transfer image-receiving sheet having high sensitivity and excellent image preservability, and a coating composition for forming the heat-sensitive transfer image-receiving sheet.

BACKGROUND OF THE INVENTION

Various heat transfer recording methods have been known so far. Among these methods, dye diffusion transfer recording systems attract attention as a process that can produce a color hard copy having an image quality closest to that of silver halide photography (see, for example, "Joho Kiroku (Hard Copy) to Sono Zairyo no Shintenkai (Information Recording (Hard Copy) and New Development of Recording Materials)" published by Toray Research Center Inc., 1993, pp. 241-285; and "Printer Zairyo no Kaihatsu (Development of Printer Materials)" published by CMC Publishing Co., Ltd., 1995, p. 180). Moreover, this system has advantages over silver halide photography: it is a dry system, it enables direct visualization from digital data, it makes reproduction simple, and the like.

In this dye diffusion transfer recording system, a heat-sensitive transfer sheet (hereinafter also referred to as an ink sheet) containing dyes is superposed on a heat-sensitive transfer image-receiving sheet (hereinafter also referred to as an image-receiving sheet), and then the ink sheet is heated by a thermal head whose exothermic action is controlled by electric signals, in order to transfer the dyes contained in the ink sheet to the image-receiving sheet, thereby recording an image information. Three colors: cyan, magenta, and yellow, are used for recording a color image by overlapping one color to other, thereby enabling transferring and recording a color image having continuous gradation for color densities.

As a polymer for a receptor layer which is acting as dye receptor in the outermost layer of a heat-sensitive transfer image-receiving sheet, polyester resins, polycarbonate resins, vinyl chloride resins and the like are conventionally used. In recent years, improvements of printing speed have been progressing, but, with using these resins, it is difficult to achieve both high speed printing (transferring) and excellent photographic properties, such as transfer sensitivity and image preservability, at the same time.

Polymers having a specific structure have been proposed (see, for example, JP-A-2-265789 ("JP-A" means unexamined published Japanese patent application) or JP-A-8-224967). However, they have not reached sufficient levels yet, and further improvement has been desired.

SUMMARY OF THE INVENTION

The present invention resides in a heat-sensitive transfer image-receiving sheet provided with at least one receptor layer on a support, wherein the receptor layer comprises a polymer containing a repeating unit derived from a monomer represented by formula (1),

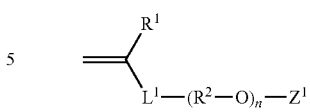

wherein, $R^1$ represents a hydrogen atom, a halogen atom or a methyl group; $L^1$ represents a divalent linking group; $R^2$ represents an alkylene group having 1 to 5 carbon atoms which may be further substituted; n represents an integer of 1 to 40; $Z^1$ represents a hydrogen atom or a linear, branched or cyclic aliphatic hydrocarbon group having 1 to 30 carbon atoms which may be further substituted; and when n is 2 or more, $R^2$s may be the same or different.

Further, the present invention resides in a coating composition for forming the heat-sensitive transfer image-receiving sheet.

Other and further features and advantages of the invention will appear more fully from the following description.

DETAILED DESCRIPTION OF THE INVENTION

In order to solve the problems, the inventors have repeatedly made eager investigations. As a result, the inventors have found out that an image-receiving sheet having high sensitivity and excellent image preservability can be formed by using a coating composition containing a specific polymer. On the basis of such a finding, the present invention has been made.

According to the present invention, there is provided the following means:

(1) A heat-sensitive transfer image-receiving sheet provided with at least one receptor layer on a support, wherein the receptor layer comprises a polymer containing a repeating unit derived from a monomer represented by formula (1),

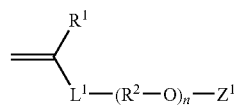

wherein, $R^1$ represents a hydrogen atom, a halogen atom or a methyl group; $L^1$ represents a divalent linking group; $R^2$ represents an alkylene group having 1 to 5 carbon atoms which may be further substituted; n represents an integer of 1 to 40; $Z^1$ represents a hydrogen atom or a linear, branched or cyclic aliphatic hydrocarbon group having 1 to 30 carbon atoms which may be further substituted; and when n is 2 or more, $R^2$s may be the same or different;

(2) The heat-sensitive transfer image-receiving sheet as described in the above item (1), wherein the monomer represented by formula (1) is a monomer represented by formula (2),

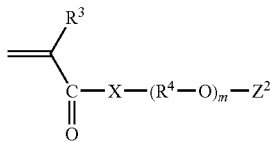

Formula (2)

wherein, $R^3$ represents a hydrogen atom, a halogen atom, or a methyl group; X represents an oxygen atom, a sulfur atom, or —N(Rc)— (in which Rc represents a hydrogen atom, an alkyl group having 1 to 8 carbon atoms or a cycloalkyl group, and the alkyl group and the cycloalkyl group may be further substituted); $R^4$ represents an alkylene group having 1 to 5 carbon atoms which may be further substituted; m represents an integer of 1 to 40; $Z^2$ represents a hydrogen atom or a linear, branched or cyclic aliphatic hydrocarbon group having 1 to 30 carbon atoms which may be further substituted; and when m is 2 or more, $R^4$s may be the same or different;

(3) The heat-sensitive transfer image-receiving sheet as described in the above item (1) or (2), wherein the monomer represented by formula (1) or (2) is a monomer represented by formula (3),

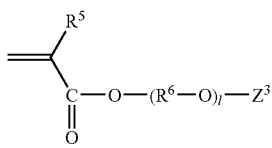

Formula (3)

wherein, $R^5$ represents a hydrogen atom, a halogen atom or a methyl group; $R^6$ represents an alkylene group having 2 to 4 carbon atoms which may be further substituted; l represents an integer of 1 to 40; $Z^3$ represents a hydrogen atom or a linear, branched or cyclic aliphatic hydrocarbon group having 1 to 20 carbon atoms which may be further substituted; and when l is 2 or more, $R^6$s may be the same or different;

(4) The heat-sensitive transfer image-receiving sheet as described in any one of the above items (1) to (3), wherein the polymer is a copolymer containing, as essential copolymer components, a unit derived from a nitrile-series monomer, a unit derived from an aromatic vinyl monomer and a unit derived from a (meth)acrylate;

(5) The heat-sensitive transfer image-receiving sheet as described in any one of the above items (1) to (4), wherein a heat-insulation layer containing hollow particles is provided between the support and the receptor layer; and (6) A coating composition for forming a heat-sensitive transfer image-receiving sheet provided with at least one receptor layer on a support, wherein the composition comprises the above-described polymer containing a repeating unit derived from a monomer represented by formula (1).

Hereinafter, the present invention will be described in detail.

The constitutional requirements described below may be embodied on the basis of the representative embodiments of the present invention. However the present invention is not limited to such embodiments.

In the present specification, "to" denotes a range including numerical values described before and after it as a minimum value and a maximum value.

(Layer Constitution of Heat-Sensitive Transfer Image-Receiving Sheet)

The heat-sensitive transfer image-receiving sheet of the present invention is provided with a dye-receiving layer (receptor layer) on a support. It is preferable to form an undercoat layer between the receptor layer and the support. As the undercoat layer, for example, a white background control layer, a charge control layer, an adhesive layer and a primer layer can be formed. Also, a heat insulation layer is preferably formed between the undercoat layer and the support. In the present invention, each layer provided between the support and the receptor layer is simply referred to as "intermediate layer", and therein are included the undercoat layer and the heat insulation layer. The heat-sensitive transfer image-receiving sheet of the present invention preferably contains at least one receptor layer and at least one intermediate layer. It is preferable that a curling control layer, a writing layer, or a charge-control layer be formed on the backside of the support.

(Polymer Contained in the Receptor Layer)

In the present invention, the receptor layer contains a polymer having a repeating unit derived from a monomer represented by formula (1). Further, the coating composition for forming a heat-sensitive transfer image-receiving sheet of the present invention contains a polymer having a repeating unit derived from a monomer represented by formula (1). The coating composition is particularly preferably used for forming a receptor layer.

The polymer according to the present invention having a repeating unit derived from a monomer represented by formula (1) (hereinafter also referred to as a polymer containing an alkylene oxide chain or a polymer for use in the present invention) is explained below. The polymer for use in the present invention does not mean any polymer latex (latex polymer), so it does not encompass any polymer latex.

The polymer for use in the present invention has a repeating unit derived from a monomer represented by formula (1).

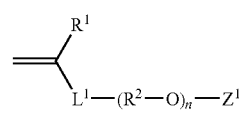

Formula (1)

In formula (1), $R^1$ represents a hydrogen atom, a halogen atom or a methyl group; $L^1$ represents a divalent linking group; $R^2$ represents an alkylene group having 1 to 5 carbon atoms which may be further substituted; n represents an integer of 1 to 40; $Z^1$ represents a hydrogen atom or a linear, branched or cyclic aliphatic hydrocarbon group having 1 to 30 carbon atoms which may be further substituted; and when n is 2 or more, $R^2$s may be the same or different.

When $R^1$ represents a halogen atom, the halogen atom is preferably a fluorine atom or a chlorine atom.

The divalent linking group represented $L^1$, though it may be any linking group, is preferably a single bond, —O—, —C(=O)—, —NR$^{11}$— (in which R$^{11}$ represents a hydrogen atom, an alkyl group, a cycloalkyl group, an aryl group or an aralkyl group), —S—, —SO$_2$—, —P(=O)(OR$^{12}$)— (in which R$^{12}$ represents an alkyl group, a cycloalkyl group, an aryl group or an aralkyl group), an alkylene group, an arylene group, or a divalent linking group formed by combining any two or more of the above-described ones; more preferably a group represented by —C(=O)—X'— or a phenylene group which may be have a substituent; and still more preferably a group represented by —C(=O)—X'—. Herein, X' represents an oxygen atom, a sulfur atom or —N(R⁰)—, and R⁰ represents a hydrogen atom or a substituent (in which the substituent is preferably an alkyl group, a cycloalkyl group, an aryl group or a heterocyclic group, and more preferably the group represented by Rc described hereinafter). $L^1$ is most preferably —C(=O)—O—.

The alkylene group represented by $R^2$ may be straight-chain or branched, but it is preferably a straight-chain alkylene group. The number of carbon atoms in the alkylene group is preferably from 2 to 4.

n is preferably an integer of 1 to 30, more preferably an integer of 1 to 20, and most preferably an integer of 1 to 10.

Examples of the aliphatic hydrocarbon group represented by $Z^1$ include an alkyl group, an alkenyl group, an alkynyl group, a cycloalkyl group, a cycloalkenyl group and a cycloalkynyl group. Of these groups, an alkyl group, an alkenyl group, a cycloalkyl group and a cycloalkenyl group are preferable, an alkyl group and a cycloalkyl group are further preferable, and an alkyl group is further more preferable.

The number of carbon atoms in each of the alkenyl group and the alkynyl group is preferably from 2 to 30 (more preferably from 2 to 20). The number of carbon atoms in the cycloalkyl group is preferably from 3 to 30 (more preferably from 5 to 20). The number of carbon atoms in the cycloalkynyl group is preferably from 6 to 30 (more preferably from 6 to 20). The number of carbon atoms in the alkyl group is more preferably from 1 to 20.

$Z^1$ is preferably a hydrogen atom or an aliphatic group falling within the foregoing preferred range, and more preferably a hydrogen atom or an alkyl group.

Herein, in the present specification, the term "substituent" or the term "substituent" in the expression of "may have a substituent", as used in descriptions of various formulae including formula (1), is explained.

In the present invention, such a substituent may include any substituents, but it is preferably selected from the following substituent groups.

Examples of the substituent groups include an alkyl group (preferably an alkyl group having 1 to 20 carbon atoms, more preferably 1 to 12 carbon atoms, and particularly preferably 1 to 8 carbon atoms, e.g., methyl, ethyl, isopropyl, tert-butyl, n-octyl, n-decyl, n-hexadecyl, cyclopropyl, cyclopentyl, cyclohexyl), an alkenyl group (preferably an alkenyl group having 2 to 20 carbon atoms, more preferably 2 to 12 carbon atoms, and particularly preferably 2 to 8 carbon atoms, e.g., vinyl, allyl, 2-butenyl, 3-pentenyl), an alkynyl group (preferably an alkynyl group having 2 to 20 carbon atoms, more preferably 2 to 12 carbon atoms, and particularly preferably 2 to 8 carbon atoms, e.g., propargyl, 3-pentynyl), an aryl group (preferably an aryl group having 6 to 30 carbon atoms, more preferably 6 to 20 carbon atoms, and particularly preferably 6 to 12 carbon atoms, e.g., phenyl, p-methylphenyl, naphthyl), an unsubstituted amino group or substituted amino group (preferably an amino group having 0 to 20 carbon atoms, more preferably 0 to 10 carbon atoms, particularly preferably 0 to 6 carbon atoms, e.g., unsubstituted amino, methylamino, dimethylamino, diethylamino, anilino), an alkoxy group (preferably an alkoxy group having 1 to 20 carbon atoms, more preferably 1 to 16 carbon atoms, particularly preferably 1 to 10 carbon atoms, e.g., methoxy, ethoxy, butoxy), an alkoxycarbonyl group (preferably an alkoxycarbonyl group having 2 to 20 carbon atoms, more preferably 2 to 16 carbon atoms, particularly preferably 2 to 10 carbon atoms, e.g., methoxycarbonyl, ethoxycarbonyl), an acyloxy group (preferably an acyloxy group having 2 to 20 carbon atoms, more preferably 2 to 16 carbon atoms, and particularly preferably 2 to 10 carbon atoms, e.g., acetoxy, benzoyloxy), an acylamino group (preferably an acylamino group having 2 to 20 carbon atoms, more preferably 2 to 16 carbon atoms, and particularly preferably 2 to 10 carbon atoms, e.g., acetylamino, benzoylamino), an alkoxycarbonylamino group (preferably an alkoxycarbonylamino group having 2 to 20 carbon atoms, more preferably 2 to 16 carbon atoms, and particularly preferably 2 to 12 carbon atoms, e.g., methoxycarbonylamino), an aryloxycarbonylamino group (preferably an aryloxycarbonylamino group having 7 to 20 carbon atoms, more preferably 7 to 16 carbon atoms, and particularly preferably 7 to 12 carbon atoms, e.g., phenyloxycarbonylamino), a sulfonylamino group (preferably a sulfonylamino group having 1 to 20 carbon atoms, more preferably 1 to 16 carbon atoms, and particularly preferably 1 to 12 carbon atoms, e.g., methanesulfonylamino, benzenesulfonylamino), a sulfamoyl group (preferably a sulfamoyl group having 0 to 20 carbon atoms, more preferably 0 to 16 carbon atoms, and particularly preferably 0 to 12 carbon atoms, e.g., sulfamoyl, methylsulfamoyl, dimethylsulfamoyl, phenylsulfamoyl), a carbamoyl group (preferably a carbamoyl group having 1 to 20 carbon atoms, more preferably 1 to 16 carbon atoms, and particularly preferably 1 to 12 carbon atoms, e.g., unsubstituted carbamoyl, methylcarbamoyl, diethylcarbamoyl, phenylcarbamoyl), an alkylthio group (preferably an alkylthio group having 1 to 20 carbon atoms, more preferably 1 to 16 carbon atoms, and particularly preferably 1 to 12 carbon atoms, e.g., methylthio, ethylthio), an arylthio group (preferably an arylthio group having 6 to 20 carbon atoms, more preferably 6 to 16 carbon atoms, and particularly preferably 6 to 12 carbon atoms, e.g., phenylthio), a sulfonyl group (preferably a sulfonyl group having 1 to 20 carbon atoms, more preferably 1 to 16 carbon atoms, and particularly preferably 1 to 12 carbon atoms, e.g., mesyl, tosyl), a sulfinyl group (preferably a sulfinyl group having 1 to 20 carbon atoms, more preferably 1 to 16 carbon atoms, and particularly preferably 1 to 12 carbon atoms, e.g., methanesulfinyl, benzenesulfinyl), a ureido group (preferably a ureido group having 1 to 20 carbon atoms, more preferably 1 to 16 carbon atoms, and particularly preferably 1 to 12 carbon atoms, e.g., unsubstituted ureido, methylureido, phenylureido), a phosphoric acid amido group (preferably a phosphoric acid amido group having 1 to 20 carbon atoms, more preferably 1 to 16 carbon atoms, and particularly preferably 1 to 12 carbon atoms, e.g., diethylphosphoric acid amido, phenylphosphoric acid amido), a hydroxyl group, a mercapto group, a halogen atom (e.g., fluorine, chlorine, bromine, iodine), a cyano group, a sulfo group, a carboxyl group, a nitro group, a hydroxamic acid group, a sulfino group, a hydrazino group, an imino group, a heterocyclic group (preferably a heterocyclic group having 1 to 30 carbon atoms, and more preferably 1 to 12 carbon atoms; as hetero atoms, e.g., nitrogen, oxygen, sulfur; and specifically, e.g., imidazolyl, pyridyl, quinolyl, furyl, piperidyl, morpholino, benzoxazolyl, benzimidazolyl, benzothiazolyl), and a silyl group (preferably a silyl group having 3 to 40 carbon atoms, more preferably 3 to 30 carbon atoms, particularly preferably 3 to 24 carbon atoms, e.g., trimethylsilyl, triphenylsilyl).

These substituents may further be substituted with the substituent described above. When there are two or more substituents, they may be the same or different. The substituents may bond together, to form a ring, if possible.

The monomer represented by formula (1) is preferably a monomer represented by formula (2).

Formula (2)

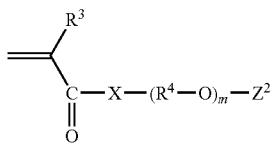

In formula (2), $R^3$ represents a hydrogen atom, a halogen atom, or a methyl group; X represents an oxygen atom, a sulfur atom, or —N(Rc)— (in which Rc represents a hydrogen atom, an alkyl group having 1 to 8 carbon atoms or a cycloalkyl group, and the alkyl group and the cycloalkyl group may be further substituted); $R^4$ represents an alkylene group having 1 to 5 carbon atoms which may be further substituted; m represents an integer of 1 to 40; $Z^2$ represents a hydrogen atom or a linear, branched or cyclic aliphatic hydrocarbon group having 1 to 30 carbon atoms which may be further substituted; and when m is 2 or more, $R^4$s may be the same or different.

In formula (2), $R^3$, $R^4$, m and $Z^2$ have the same meanings as $R^1$, $R^2$, n and $Z^1$ in formula (1), respectively, and the preferable ranges thereof are also the same.

X is preferably an oxygen atom. The number of carbon atoms in the alkyl group represented by Rc is preferably from 3 to 8. The number of carbon atoms in the cycloalkyl group represented by Rc is preferably from 3 to 8.

The monomer represented by formula (1) or (2) is more preferably a monomer represented by formula (3).

Formula (3)

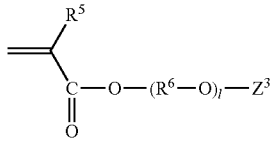

In formula (3), $R^5$ represents a hydrogen atom, a halogen atom or a methyl group; $R^6$ represents an alkylene group having 2 to 4 carbon atoms which may be further substituted; l represents an integer of 1 to 40; $Z^3$ represents a hydrogen atom or a linear, branched or cyclic aliphatic hydrocarbon group having 1 to 20 carbon atoms which may be further substituted; and when l is 2 or more, $R^6$s may be the same or different.

In formula (3), $R^5$, $R^6$ and l have the same meanings as $R^1$, $R^2$ and n in formula (1), respectively, and the preferable ranges thereof are also the same.

$Z^3$ has the same preferable range as $Z^1$ as far as $Z^1$ encompasses the range.

Specific examples of the monomer represented by any one of formulae (1) to (3) are shown below, but the present invention is not limited by these examples.

A-1

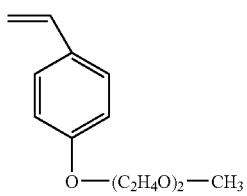

A-2

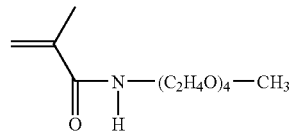

A-3

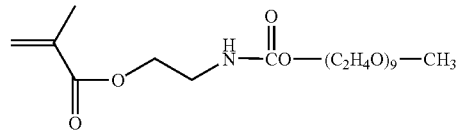

A-4

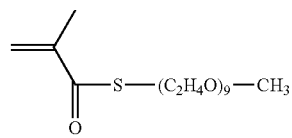

A-5

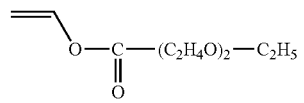

A-6

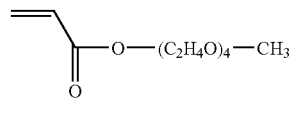

A-7

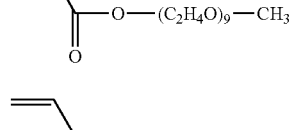

A-8

A-9

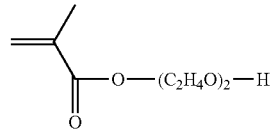

A-10

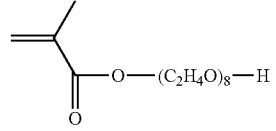

A-11

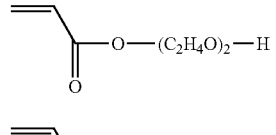

A-12

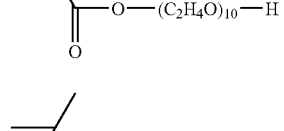

A-13

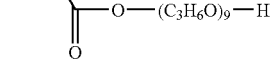

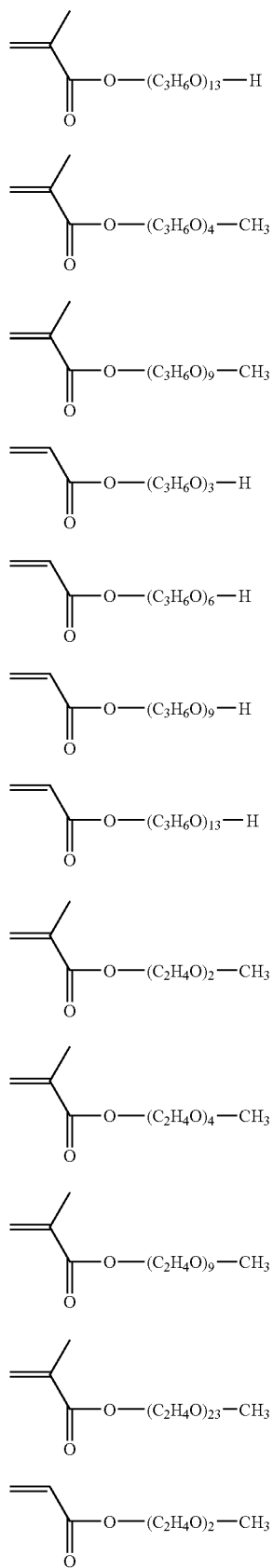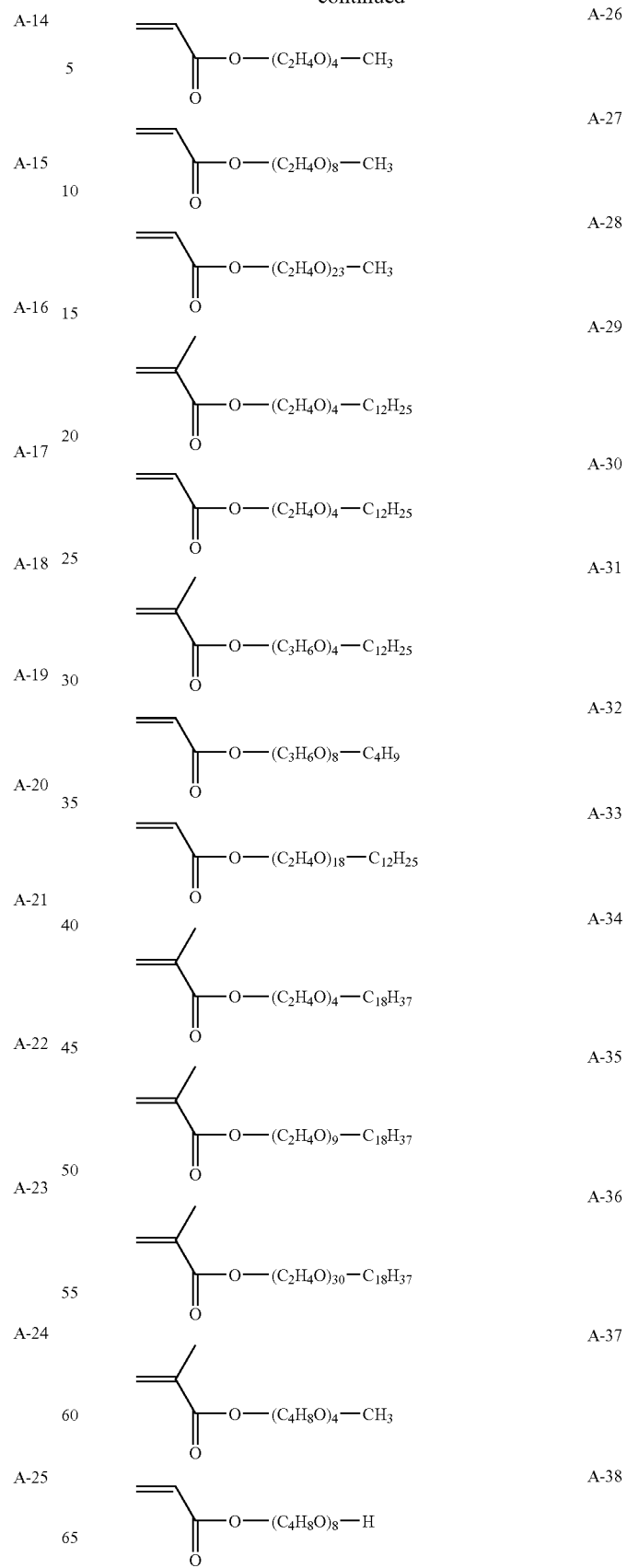

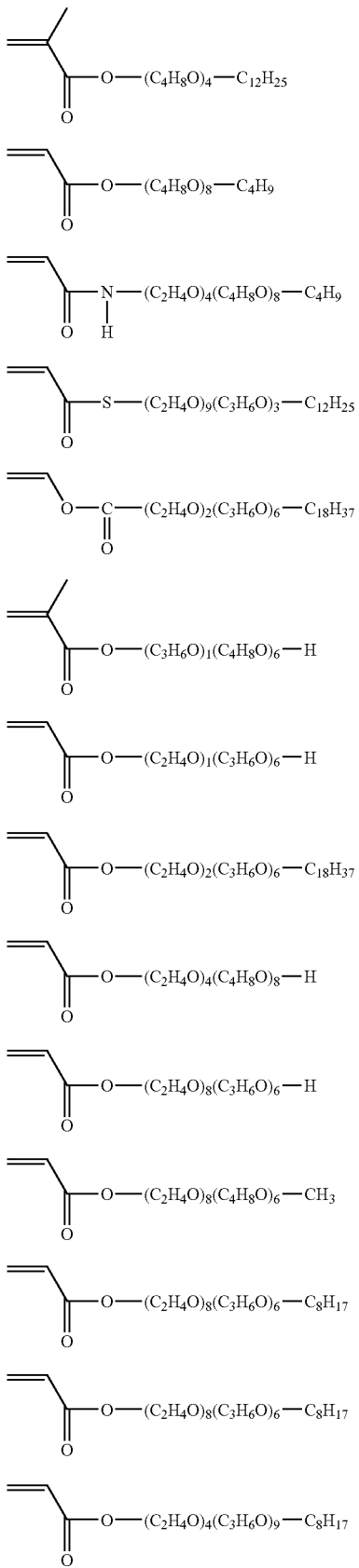

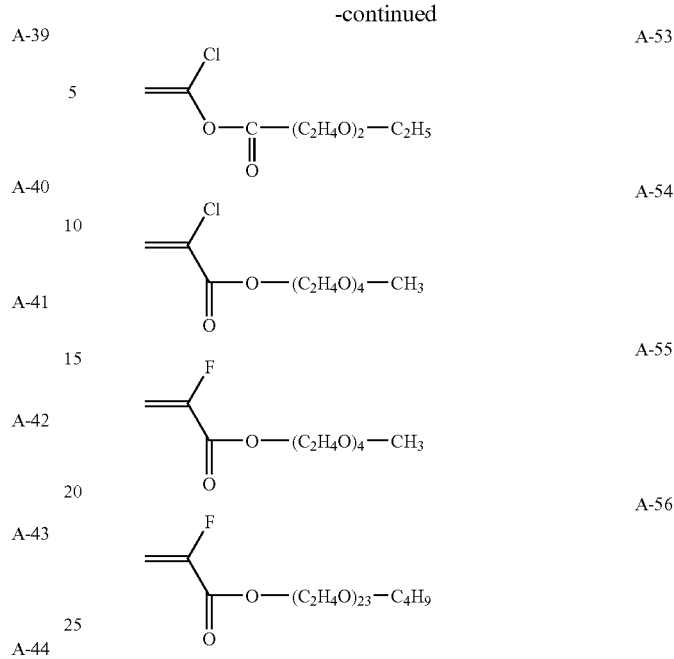

As the monomer represented by any one of formulae (1) to (3), the BLEMMER-series monomers manufactured by NOF Corporation and the ARONIX-series monomers manufactured by TOAGOSEI Co., Ltd. can be used (all trade names).

The polymer for use in the present invention may be a copolymer obtained by polymerizing the monomer(s) represented by any one of formulae (1) to (3) and a different monomer(s) which is capable of being polymerized with the monomer represented by formulae (1) to (3).

There is no particular limitation to the different monomer other than the monomer represented by any one of formulae (1) to (3), and the following monomer groups (a) to (j) may be preferably used as those polymerizable in a usual radical polymerization or ion polymerization method. These monomers may be selected singly or combined freely to synthesize the polymer for use in the present invention.

—Monomer Groups (a) to (j)—

(a) Conjugated dienes: 1,3-pentadiene, isoprene, 1-phenyl-1,3-butadiene, 1-α-naphthyl-1,3-butadiene, 1-β-naphthyl-1,3-butadiene, cyclopentadiene, etc.

(b) Olefins: ethylene, propylene, vinyl chloride, vinylidene chloride, 6-hydroxy-1-hexene, 4-pentenoic acid, methyl 8-nonenate, vinylsulfonic acid, trimethylvinylsilane, trimethoxyvinylsilane, 1,4-divinylcyclohexane, 1,2,5-trivinylcyclohexane, etc.

(c) α,β-unsaturated carboxylates: alkyl acrylates, such as methyl acrylate, ethyl acrylate, butyl acrylate, cyclohexyl acrylate, 2-ethylhexyl acrylate, and dodecyl acrylate; substituted alkyl acrylates, such as benzyl acrylate, and 2-cyanoethyl acrylate; alkyl methacrylates, such as methyl methacrylate, butyl methacrylate, 2-ethylhexyl methacrylate, and dodecyl methacrylate; substituted alkyl methacrylates, such as 2-hydroxyethyl methacrylate, glycidyl methacrylate, glycerin monomethacrylate, 2-acetoxyethyl methacrylate, tetrahydrofurfuryl methacrylate, 2-methoxyethyl methacrylate, polypropylene glycol monomethacrylates (mole number of added polyoxypropylene=2 to 100), 3-N,N-dimethylaminopropyl methacrylate, 2-carboxyethyl methacrylate, 3-sulfopropyl methacrylate, 4-oxysulfobutyl methacrylate, 3-trimethoxysilylpropyl methacrylate, allyl methacrylate, and 2-isocyanatoethyl methacrylate; derivatives of unsaturated dicarboxylic acids, such as monobutyl maleate, dimethyl maleate, monomethyl itaconate, and dibutyl itaconate; multifunctional esters, such as ethylene glycol diacrylate, ethylene glycol dimethacrylate, 1,4-cyclohexane diacrylate, pentaerythritol tetramethacrylate, pentaerythritol triacrylate, trimethylolpropane triacrylate, trimethylolethane triacrylate, dipentaerythritol pentamethacrylate, pentaerythritol hexaacrylate, and 1,2,4-cyclohexane tetramethacrylate; etc.

(d) α,β-unsaturated carboxylic amides: acrylamide, methacrylamide, N-methylacrylamide, N,N-dimethylacrylamide, N-methyl-N-hydroxyethylmethacrylamide, N-tert-butylacrylamide, N-tert-octylmethacrylamide, N-cyclohexylacrylamide, N-phenylacrylamide, N-(2-acetoacetoxyethyl)acrylamide, N-acryloylmorpholine, diacetone acrylamide, itaconic diamide, N-methylmaleimide, 2-acrylamide-methylpropane sulfonic acid, methylenebisacrylamide, dimethacryloylpiperazine, etc.

(e) Unsaturated nitriles: acrylonitrile, methacrylonitrile, etc.

(f) Styrene and derivatives thereof: styrene, vinyltoluene, p-tert-butylstyrene, vinylbenzoic acid, methyl vinylbenzoate, α-methylstyrene, vinylnaphthalene, p-hydroxymethylstyrene, sodium p-styrenesulfonate, potassium p-styrenesulfinate, p-aminomethylstyrene, 1,4-divinylbenzene, etc.

(g) Vinyl ethers: methyl vinyl ether, butyl vinyl ether, methoxyethyl vinyl ether, etc.

(h) Vinyl esters: vinyl acetate, vinyl propionate, vinyl benzoate, etc.

(j) Other polymerizable monomers: N-vinylimidazole, 4-vinylpyridine, N-vinylpyrrolidone, 2-vinyloxazoline, 2-isopropenyloxazoline, divinylsulfone, etc.

Further, the polymer used in the present invention is preferably a quaternary copolymer or a copolymer having five (5) or more polymer units, which is prepared using the above-described monomer represented by formula (1), the α,β-unsaturated carboxylates (c), the unsaturated nitrites (e), and the styrene or derivatives thereof (f), as essential components. In the present invention, this copolymer is preferably used in the point that the crystallinity of the resultant copolymer is generally decreased.

Examples of the specific constitution of the polymer for use in the present invention are shown below, but the constitution of the polymer is not limited to these examples. Each number in the following constitutions represents the ratio by mass of each of monomer components, and Mw represents the mass average molecular weight. The following specific examples may each be a random copolymer or a block copolymer, but are each not limited to a block copolymer as exemplified below.

P-1

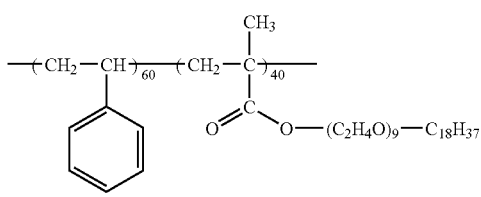

Mw 95000

P-2

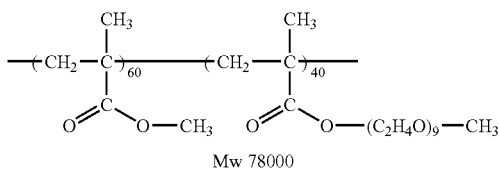

Mw 78000

P-3

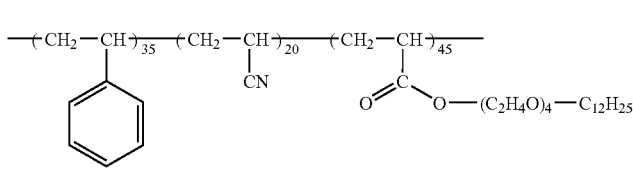

Mw 55000

P-4

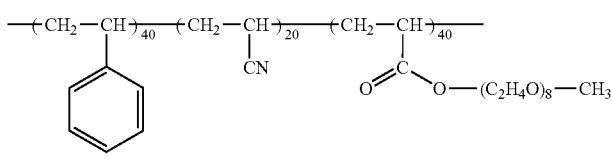

Mw 48000

-continued
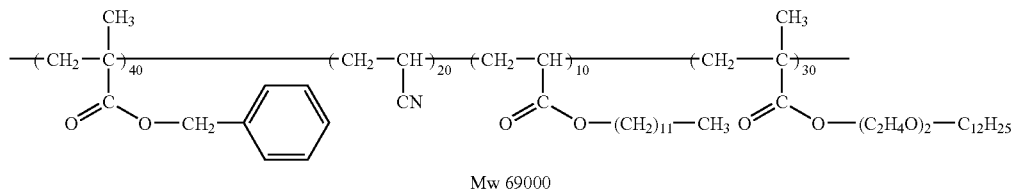
P-5
Mw 69000
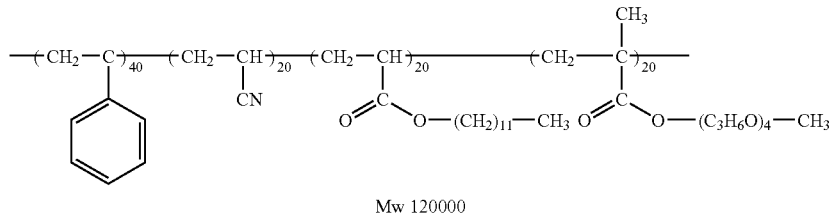
P-6
Mw 120000
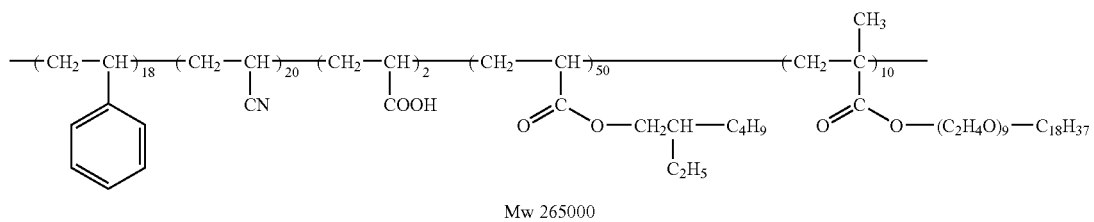
P-7
Mw 265000
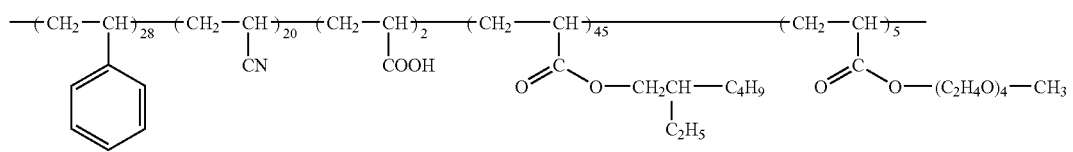
P-8
Mw 150000
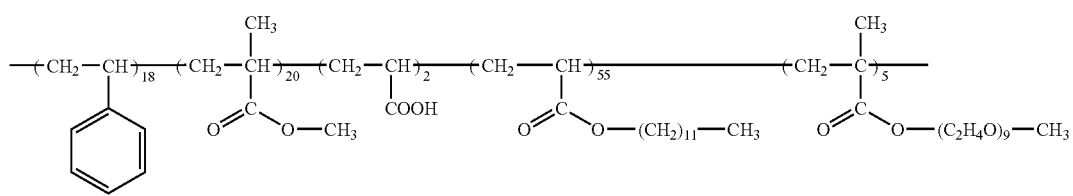
P-9
Mw 220000
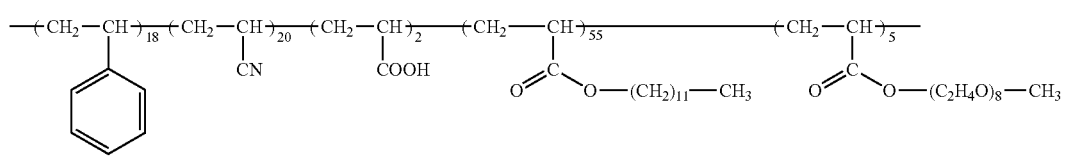
P-10
Mw 185000
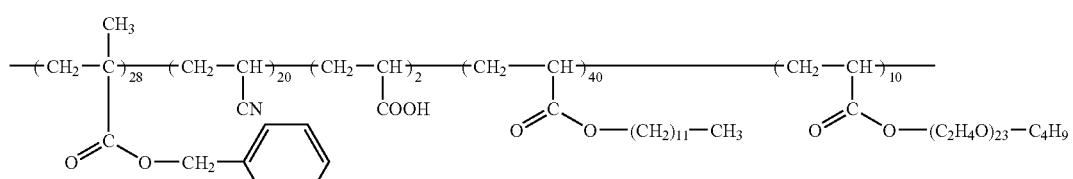
P-11
Mw 320000

-continued
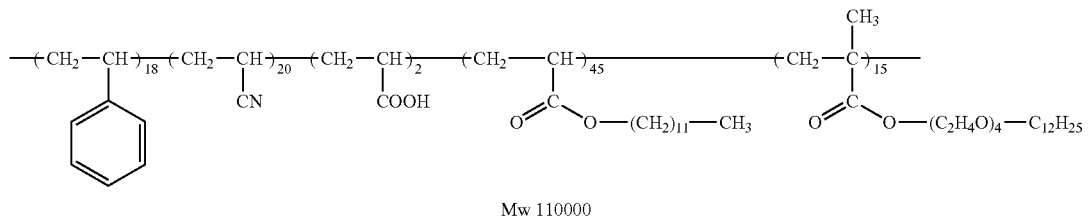
P-12
Mw 110000
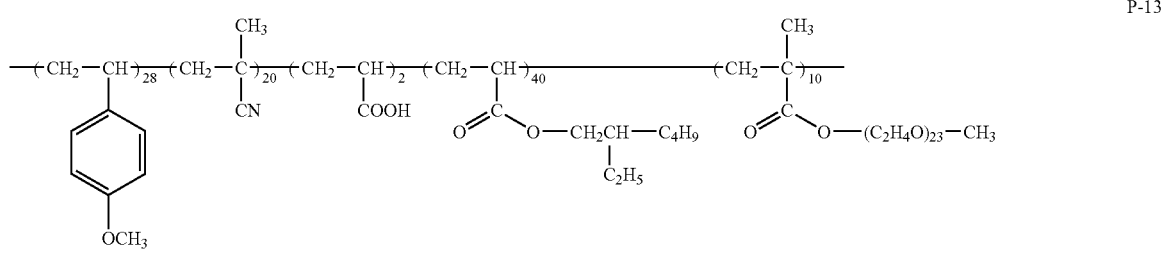
P-13
Mw 95000
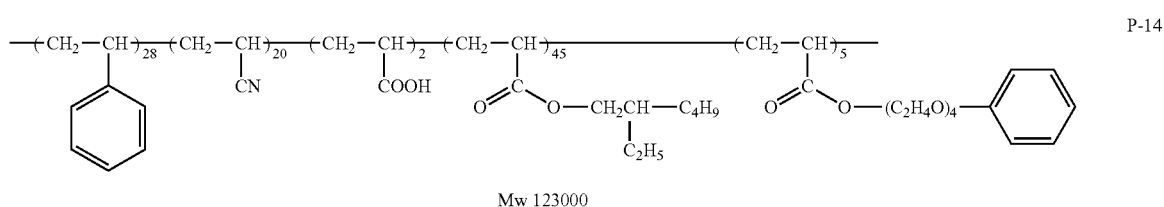
P-14
Mw 123000
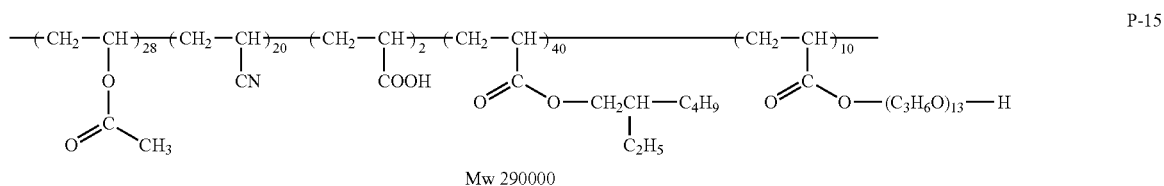
P-15
Mw 290000
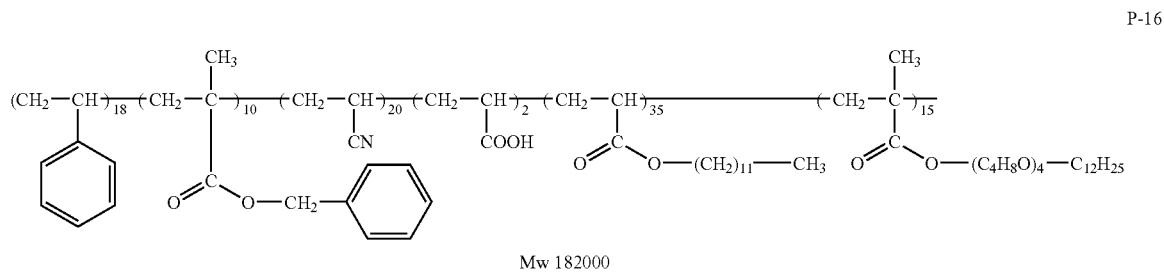
P-16
Mw 182000
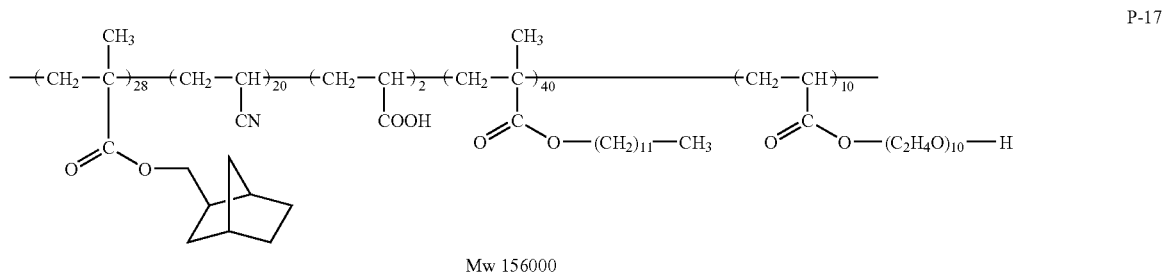
P-17
Mw 156000

-continued
P-18
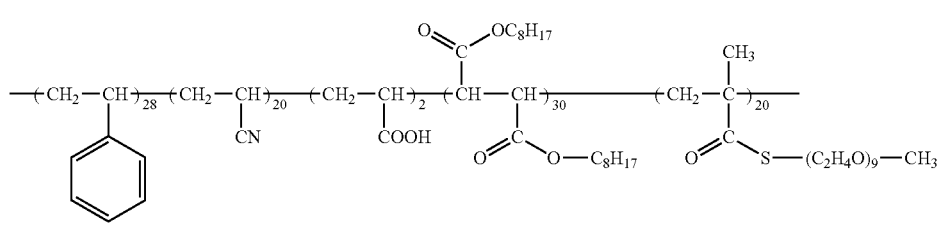
Mw 350000
P-19
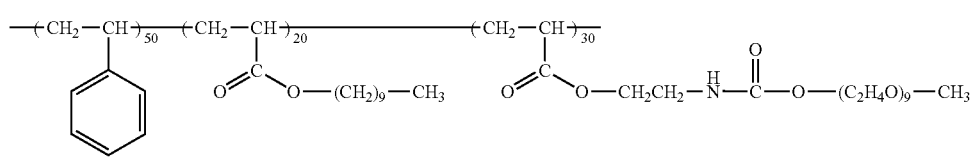
Mw 111000
P-20
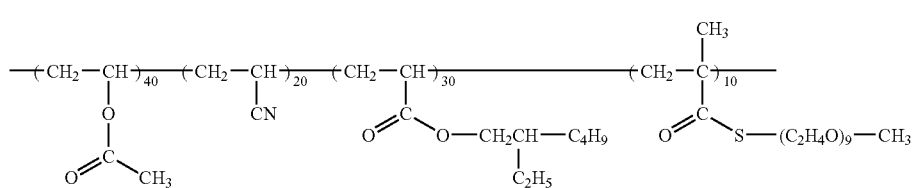
Mw 172000
P-21
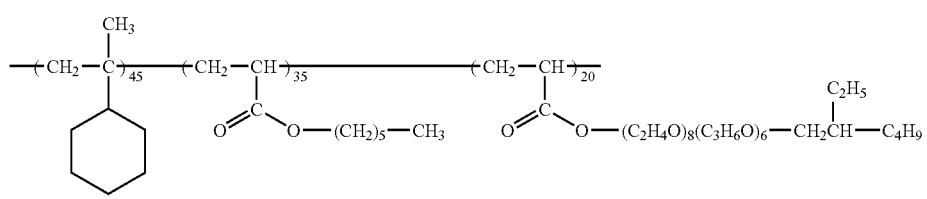
Mw 199000
P-22
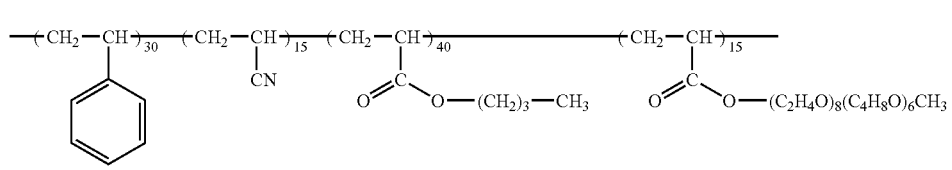
Mw 422000
P-23
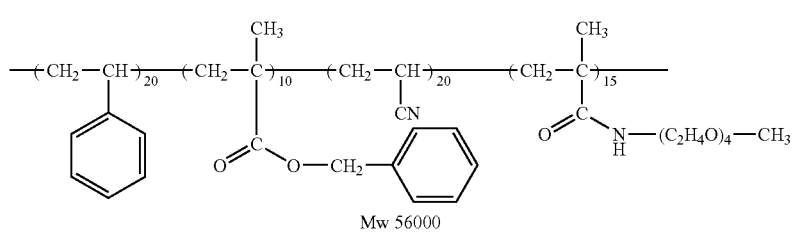
Mw 56000
P-24
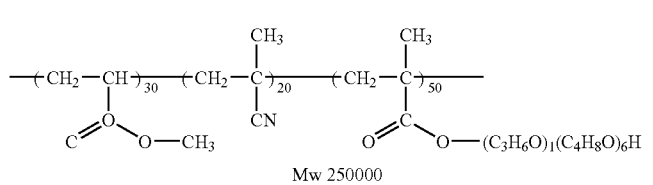
Mw 250000

-continued
P-25
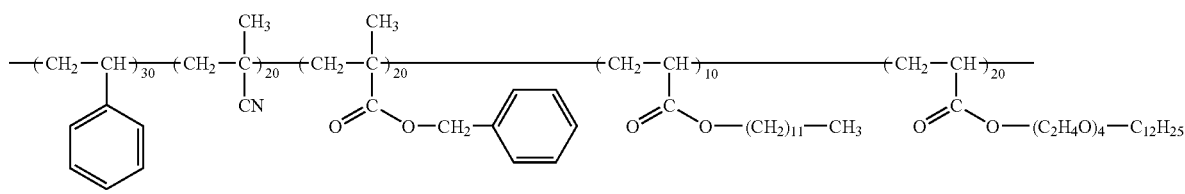
Mw 43000
P-26
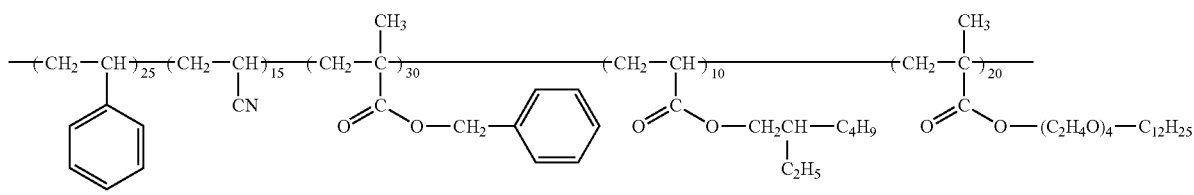
Mw 65000
P-27
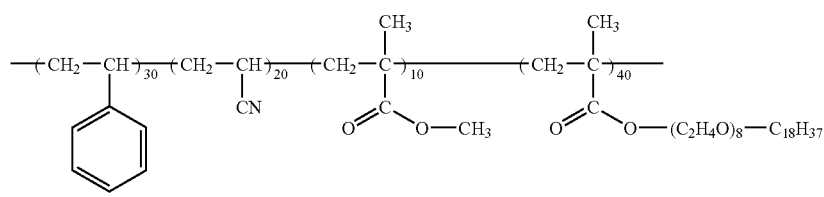
Mw 72000
P-28
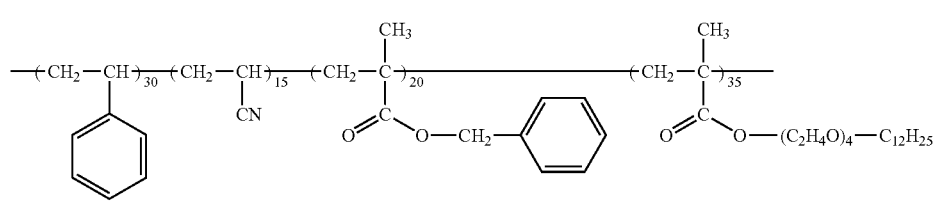
Mw 31000
P-29
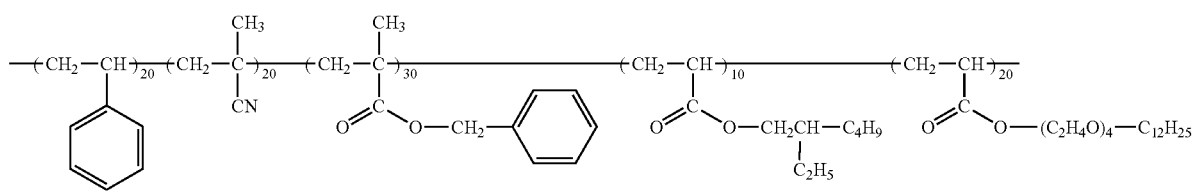
Mw 55000
P-30
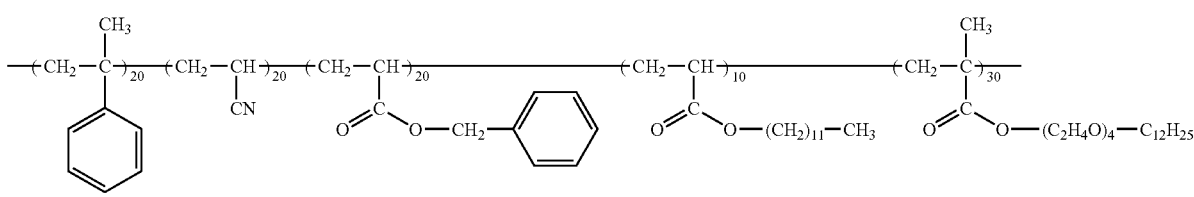
Mw 46000

The polymer for use in the present invention can be produced by the use of a known, common method, and it can be easily obtained by a solution polymerization method, a suspension polymerization method, a dispersion polymerization method, an anionic polymerization method, a cationic polymerization method, or the like.

For example, the polymer can be produced by polymerizing the aforementioned monomer represented by formula (1) in an organic solvent through addition of a general-purpose radical polymerization initiator. In some cases, the polymer can be produced by using an addition polymerizable unsaturated compound other than the foregoing monomer and performing polymerization according to the same method as mentioned above. According to polymerizability of each monomer, a dropping polymerization method in which polymerization is performed while dropping a monomer and an initiator into a reaction vessel, is also effective in preparing a polymer having a uniform composition.

Further, in the case of preparing a polymer made of monomers having a small polymerizability or preparing a polymer having a uniform composition made of plural monomers each having a different polymerizability, an emulsion polymerization method can be preferably used.

The polymerization initiator may be any polymerization initiator having radical generating ability. The polymerization initiator to be used may be selected from inorganic peroxides such as persulfates and hydrogen peroxide, peroxides described in the organic peroxide catalogue of NOF Corporation, and azo compounds as described in the azo polymerization initiator catalogue of Wako Pure Chemical Industries, Ltd.

The above-mentioned polymer can be applied on the support by being dissolved in a proper organic solvent (e.g. methyl ethyl ketone, ethyl acetate, benzene, toluene and xylene). When the polymer is synthesized by the emulsion polymerization method, the polymer can be applied on the support by using an aqueous coating solution in which the polymer is dispersed in a form of a latex, or by using an organic solution in which the polymer is dissolved in the organic solvent after removing the water from the prepared polymer emulsion.

In the present invention, a polymer or latex polymer other than the polymer defined in the present invention may further be used in the receptor layer in combination with the polymer defined in the present invention.

Such the polymer or latex polymer other than the polymer for use in the present invention is preferably a polymer. Examples of the polymer that can be used in combination with the polymer for use in the present invention include vinyl-series resins, such as halogenated polymers (e.g., polyvinyl chloride and polyvinylidene chloride), polyvinyl acetate, ethylene-vinyl acetate copolymer, vinyl chloride-vinyl acetate copolymer, polyacryl ester, polystyrene, and polystyrene acrylate; acetal-series polymers, such as polyvinylformal, polyvinylbutyral, and polyvinylacetal; polyester-series polymers, such as polyethylene terephthalate, polybutylene terephthalate, and polycaprolactone (e.g., PLACCEL H-5 (trade name) manufactured by DAICEL CHEMICAL INDUSTRIES, LTD.); polycarbonate-series polymers; cellulose-series polymers, such as those described in JP-A-4-296595 and JP-A-2002-264543; cellulose-series polymers, such as cellulose acetate butyrate (e.g., CAB551-0.2 and CAB321-0.1 (each trade name) manufactured by Eastman Chemical Company); polyolefin-series polymers, such as polypropylene; polyamide-series polymers, such as urea resins, melamine resins, and benzoguanamine resins; and water-soluble polymers, such as gelatins, and polyvinyl alcohols.

The latex polymer that can be used in combination with the polymer for use in the present invention is described below.

-Latex Polymer-

The latex polymer that can be used in combination for use in the receptor layer is a dispersion in which water-insoluble hydrophobic polymers are dispersed as fine particles in a water-soluble dispersion medium. The dispersed state may be one in which polymer is emulsified in a dispersion medium, one in which polymer underwent emulsion polymerization, one in which polymer underwent micelle dispersion, one in which polymer molecules partially have a hydrophilic structure and thus the molecular chains themselves are dispersed in a molecular state, or the like.

Latex polymers are described in "Gosei Jushi Emulsion (Synthetic Resin Emulsion)", compiled by Taira Okuda and Hiroshi Inagaki, issued by Kobunshi Kanko Kai (1978); "Gosei Latex no Oyo (Application of Synthetic Latex)", compiled by Takaaki Sugimura, Yasuo Kataoka, Souichi Suzuki, and Keishi Kasahara, issued by Kobunshi Kanko Kai (1993); Soichi Muroi, "Gosei Latex no Kagaku (Chemistry of Synthetic Latex)", issued by Kobunshi Kanko Kai (1970); Yoshiaki Miyosawa (supervisor) "Suisei Coating-Zairyo no Kaihatsu to Oyo (Development and Application of Aqueous Coating Material)", issued by CMC Publishing Co., Ltd. (2004) and JP-A-64-538, and so forth. The dispersed particles preferably have a mean average particle size (diameter) of about 1 to 50,000 nm, more preferably about 5 to 1,000 nm. The particle size distribution of the dispersed particles is not particularly limited, and the particles may have either wide particle-size distribution or monodispersed particle-size distribution.

Generally, the emulsion polymerization method can be conducted according to the disclosures of the following documents: "Gosei Jushi Emarujon (Synthetic Resin Emulsions)" (edited by Taira Okuda and Hiroshi Inagaki and published by Kobunshi Kankokai (1978)); "Gosei Ratekkusu no Oyo (Applications of Synthetic Latexes)" (edited by Takaaki Sugimura, Yasuo Kataoka, Soichi Suzuki, and Keiji Kasahara and published by Kobunshi Kankokai (1993)); and "Gosei Ratekkusu no Kagaku (Chemistry of Synthetic Latexes)" (edited by Soichi Muroi and published by Kobunshi Kankokai (1970)). The emulsion polymerization method for synthesizing the latex polymer that can be used in the present invention may be a batch polymerization method, a monomer (continuous or divided) addition method, an emulsion addition method, or a seed polymerization method. The emulsion polymerization method is preferably a batch polymerization method, a monomer (continuous or divided) addition method, or an emulsion addition method in view of the productivity of latex.

The polymerization initiator may be any polymerization initiator having radical generating ability. The polymerization initiator to be used may be selected from inorganic peroxides such as persulfates and hydrogen peroxide, peroxides described in the organic peroxide catalogue of NOF Corporation, and azo compounds as described in the azo polymerization initiator catalogue of Wako Pure Chemical Industries, Ltd. Among them, water-soluble peroxides such as persulfates and water-soluble azo compounds as described in the azo polymerization initiator catalogue of Wako Pure Chemical Industries, Ltd. are preferable; ammonium persulfate, sodium persulfate, potassium persulfate, azobis(2-methylpropionamidine) hydrochloride, azobis(2-methyl-N-(2-hydroxyethyl)propionamide), and azobiscyanovaleric acid are more preferable; and peroxides such as ammonium persulfate, sodium persulfate, and potassium persulfate are especially preferable from the viewpoints of image preservability, solubility, and cost.

The amount of the polymerization initiator to be added is, based on the total amount of monomers, preferably 0.3 mass % to 2.0 mass %, more preferably 0.4 mass % to 1.75 mass %, and especially preferably 0.5 mass % to 1.5 mass %.

The polymerization emulsifier to be used may be selected from anionic surfactants, nonionic surfactants, cationic surfactants, and ampholytic surfactants. Among them, anionic surfactants are preferable from the viewpoints of dispersibility and image preservability. Sulfonic acid type anionic surfactants are more preferable because polymerization stability can be ensured even with a small addition amount and they have resistance to hydrolysis. Long chain alkyldiphenyl ether disulfonic acid salts (whose typical example is PELEX SS-H (trade name) manufactured by Kao Corporation,) are still more preferable, and low electrolyte types such as PIONIN A-43-S (trade name, manufactured by Takemoto Oil & Fat Co., Ltd.) are especially preferable.

The amount of sulfonic acid type anionic surfactant as the polymerization emulsifier is preferably 0.1 mass % to 10.0 mass %, more preferably 0.2 mass % to 7.5 mass %, and especially preferably 0.3 mass % to 5.0 mass %, based on the total amount of monomers.

It is preferable to use a chelating agent in synthesizing the latex polymer that can be used in the present invention. The chelating agent is a compound capable of coordinating (chelating) a polyvalent ion such as metal ion (e.g., iron ion) or alkaline earth metal ion (e.g., calcium ion), and examples of the chelate compound which can be used include the compounds described in JP-B-6-8956 ("JP-B" means examined Japanese patent publication), U.S. Pat. No. 5,053,322, JP-A-4-73645, JP-A-4-127145, JP-A-4-247073, JP-A-4-305572, JP-A-6-11805, JP-A-5-173312, JP-A-5-66527, JP-A-5-158195, JP-A-6-118580, JP-A-6-110168, JP-A-6-161054, JP-A-6-175299, JP-A-6-214352, JP-A-7-114161, JP-A-7-114154, JP-A-7-120894, JP-A-7-199433, JP-A-7-306504, JP-A-9-43792, JP-A-8-314090, JP-A-10-182571, JP-A-10-182570, and JP-A-11-190892.

Preferred examples of the chelating agent include inorganic chelate compounds (e.g., sodium tripolyphosphate, sodium hexametaphosphate, sodium tetrapolyphosphate), aminopolycarboxylic acid-based chelate compounds (e.g., nitrilotriacetic acid, ethylenediaminetetraacetic acid), organic phosphonic acid-based chelate compounds (e.g., compounds described in Research Disclosure, No. 18170, JP-A-52-102726, JP-A-53-42730, JP-A-56-97347, JP-A-54-121127, JP-A-55-4024, JP-A-55-4025, JP-A-55-29883, JP-A-55-126241, JP-A-55-65955, JP-A-55-65956, JP-A-57-179843, JP-A-54-61125, and West German Patent No. 1045373), polyphenol-based chelating agents, and polyamine-based chelate compounds, with aminopolycarboxylic acid derivatives being particularly preferred.

Preferred examples of the aminopolycarboxylic acid derivative include the compounds shown in the Table attached to "EDTA (—Complexane no Kagaku—) (EDTA—Chemistry of Complexane—)", Nankodo (1977). In these compounds, a part of the carboxyl groups may be substituted by an alkali metal salt such as sodium or potassium or by an ammonium salt. More preferred examples of the aminopolycarboxylic acid derivative include iminodiacetic acid, N-methyliminodiacetic acid, N-(2-aminoethyl)iminodiacetic acid, N-(carbamoylmethyl)iminodiacetic acid, nitrilotriacetic acid, ethylenediamine-N,N'-diacetic acid, ethylenediamine-N,N'-di-α-propionic acid, ethylenediamine-N,N'-di-β-propionic acid, N,N'-ethylene-bis(α-o-hydroxyphenyl)glycine, N,N'-di(2-hydroxybenzyl)ethylenediamine-N,N'-diacetic acid, ethylenediamine-N,N'-diacetic acid-N,N'-diacetohydroxamic acid, N-hydroxyethylethylenediamine-N,N',N'-triacetic acid, ethylenediamine-N,N,N',N'-tetraacetic acid, 1,2-propylenediamine-N,N,N',N'-tetraacetic acid, d,1-2,3-diaminobutane-N,N,N',N'-tetraacetic acid, meso-2,3-diaminobutane-N,N,N',N'-tetraacetic acid, 1-phenylethylenediamine-N,N,N',N'-tetraacetic acid, d,1-1,2-diphenylethylenediamine-N,N,N',N'-tetraacetic acid, 1,4-diaminobutane-N,N,N',N'-tetraacetic acid, trans-cyclobutane-1,2-diamine-N,N,N',N'-tetraacetic acid, trans-cyclopentane-1,2-diamine-N,N,N',N'-tetraacetic acid, trans-cyclohexane-1,2-diamine-N,N,N',N'-tetraacetic acid, cis-cyclohexane-1,2-diamine-N,N,N',N'-tetraacetic acid, cyclohexane-1,3-diamine-N,N,N',N'-tetraacetic acid, cyclohexane-1,4-diamine-N,N,N',N'-tetraacetic acid, o-phenylenediamine-N,N,N',N'-tetraacetic acid, cis-1,4-diaminobutene-N,N,N', N'-tetraacetic acid, trans-1,4-diaminobutene-N,N,N',N'-tetraacetic acid, α,α'-diamino-o-xylene-N,N,N',N'-tetraacetic acid, 2-hydroxy-1,3-propanediamine-N,N,N',N'-tetraacetic acid, 2,2'-oxy-bis (ethyliminodiacetic acid), 2,2'ethylenedioxy-bis (ethyliminodiacetic acid), ethylenediamine-N,N'-diacetic acid-N,N'-di-α-propionic acid, ethylenediamine-N,N'-diacetic acid-N,N'-di-β-propionic acid, ethylenediamine-N,N,N', N'-tetrapropionic acid, diethylenetriamine-N,N,N',N'',N''-pentaacetic acid, triethylenetetramine-N,N,N',N'',N''',N'''-hexaacetic acid, and 1,2,3-triaminopropane-N,N,N',N'',N''', N''''-hexaacetic acid. In these compounds, a part of the carboxyl groups may be substituted by an alkali metal salt such as sodium or potassium or by an ammonium salt.

The amount of the chelating agent to be added is preferably 0.01 mass % to 0.4 mass %, more preferably 0.02 mass % to 0.3 mass %, and especially preferably 0.03 mass % to 0.15 mass %, based on the total amount of monomers. When the addition amount of the chelating agent is too small, metal ions entering during the preparation of the latex polymer are not sufficiently trapped, and the stability of the latex against aggregation is lowered, whereby the coating properties become worse. When the amount is too large, the viscosity of the latex increases, whereby the coating properties are lowered.

In the preparation of the latex polymer that can be used in the present invention, it is preferable to use a chain transfer agent. As the chain transfer agent, ones described in Polymer Handbook (3rd Edition) (Wiley-Interscience, 1989) are preferable. Sulfur compounds are more preferable because they have high chain-transfer ability and because the required amount is small. Especially, hydrophobic mercaptane-based chain transfer agents such as tert-dodecylmercaptane and n-dodecylmercaptane are preferable.

The amount of the chain transfer agent to be added is preferably 0.2 mass % to 2.0 mass %, more preferably 0.3 mass % to 1.8 mass %, and especially preferably 0.4 mass % to 1.6 mass %, based on the total amount of monomers.

Besides the foregoing compounds, in the emulsion polymerization, use can be made of additives, such as electrolytes, stabilizers, thickeners, defoaming agents, antioxidants, vulcanizers, antifreezing agents, gelling agents, and vulcanization accelerators, as described, for example, in Synthetic Rubber Handbook.

The latex polymer may be latex of the so-called core/shell type, other than ordinary latex polymer of a uniform structure. When using a core/shell type latex polymer, it is preferred in some cases that the core and the shell have different glass transition temperatures. The glass transition temperature (Tg) of the latex polymer that can be used in the present invention is preferably −30° C. to 100° C., more preferably 0° C. to 80° C., further more preferably 10° C. to 70° C., and especially preferably 15° C. to 60° C.

As a preferable embodiment of the latex polymer that can be used in the present invention, latex polymer may be straight-chain, branched, or cross-linked polymers, the so-called homopolymers obtained by polymerizing single type of monomers, or copolymers obtained by polymerizing two or more types of monomers. In the case of the copolymers, these copolymers may be either random copolymers or block copolymers. The molecular weight of each of these polymers is preferably 5,000 to 1,000,000, and further preferably 10,000 to 500,000 in terms of number average molecular weight. A polymer having an excessively small molecular weight imparts insufficient dynamic strength to a layer containing a latex of the polymer, and a polymer having an excessively large molecular weight brings about poor filming ability, and therefore both cases are not preferable. Crosslinkable latex polymers are also preferably used.

The latex polymer that can be used in the present invention preferably has a minimum film-forming temperature (MFT) of from −30 to 90° C., more preferably from 0 to 70° C. In order to control the minimum film-forming temperature, a film-forming aid may be added. The film-forming aid is also called a temporary plasticizer, and it is an organic compound (usually an organic solvent) that reduces the minimum film-forming temperature of a latex polymer. It is described in, for example, Souichi Muroi, "Gosei Latex no Kagaku (Chemistry of Synthetic Latex)", issued by Kobunshi Kanko Kai (1970). Preferable examples of the film-forming aid are listed below, but the compounds that can be used in the present invention are not limited to the following specific examples.

Z-1: Benzyl alcohol
Z-2: 2,2,4-Trimethylpentanediol-1,3-monoisobutyrate
Z-3: 2-Dimethylaminoethanol
Z-4: Diethylene glycol In the latex polymer that can be used in the present invention, the polymer concentration is, based on the amount of the latex liquid, preferably 10 mass % to 70 mass %, more preferably 20 mass % to 60 mass %, and especially preferably 30 mass % to 55 mass %.

The latex polymer in the image-receiving sheet that can be used in the present invention includes a state of a gel or dried film formed by removing a part of solvents by drying after coating.

In the latex polymer that can be used in combination with the polymer for use in the present invention, the latex polymers described below may be utilized. Examples of the acrylic-series polymers include Cevian A-4635, 4718, and 4601 (trade names, manufactured by Daicel Chemical Industries); Nipol Lx811, 814, 821, 820, 855, and 857×2 (trade names, manufactured by Nippon Zeon Co., Ltd.); Voncoat R3370, and 4280 (trade names, manufactured by Dai-Nippon Ink & Chemicals, Inc.); Julimer ET-410 (trade name, manufactured by Nihon Junyaku K.K.); AE116, AE119, AE121, AE125, AE134, AE137, AE140, and AE173 (trade names, manufactured by JSR Corporation); Aron A-104 (trade name, manufactured by Toagosei Co., Ltd.); NS-600X, and NS-620X (trade names, manufactured by Takamatsu Yushi K.K.); VINYBLAN 2580, 2583, 2641, 2770, 2770H, 2635, 2886, 5202C, and 2706 (trade names, manufactured by Nissin Chemical Industry Co., Ltd.).

Examples of the polyesters include FINETEX ES650, 611, 675, and 850 (trade names, manufactured by Dainippon Ink and Chemicals, Incorporated); WD-size, and WMS (trade names, manufactured by Eastman Chemical Ltd.); A-10, A-115GE, A-120, A-121, A-124GP, A-124S, A-160P, A-210, A-215GE, A-510, A-513E, A-515GE, A-520, A-610, A-613, A-615GE, A-620, WAC-10, WAC-15, WAC-17XC, WAC-20, S-110, S-110EA, S-111SL, S-120, S-140, S-140A, S-250, S-252G, S-250S, S-320, S-680, DNS-63P, NS-122L, NS-122LX, NS-244LX, NS-140L, NS-141 LX, and NS-282LX (trade names, manufactured by Takamatsu Yushi K.K.); Aronmelt PES-1000 series, and PES-2000 series (trade names, manufactured by Toagosei Co., Ltd.); Bironal MD-1100, MD-1200, MD-1220, MD-1245, MD-1250, MD-1335, MD-1400, MD-1480, MD-1500, MD-1930, and MD-1985 (trade names, manufactured by Toyobo Co., Ltd.); and Ceporjon ES (trade name, manufactured by Sumitomo Seika Chemicals Co., Ltd.).

Examples of the polyurethanes include HYDRAN AP10, AP20, AP30, AP40, and 101H, Vondic 1320NS and 1610NS (trade names, manufactured by Dainippon Ink and Chemicals, Incorporated); D-1000, D-2000, D-6000, D-4000, and D-9000 (trade names, manufactured by Dainichi Seika Color & Chemicals Mfg. Co., Ltd.); NS-155X, NS-310A, NS-310X, and NS-311X (trade names, manufactured by Takamatsu Yushi K.K.); Elastron (trade name, manufactured by Dai-ichi Kogyo Seiyaku Co., Ltd.).

Examples of the rubbers include LACSTAR 7310K, 3307B, 4700H, and 7132C (trade names, manufactured by Dainippon Ink & Chemicals Incorporated); Nipol Lx416, LX410, LX430, LX435, LX110, LX415A, LX438C, 2507H, LX303A, LX407BP series, V1004, and MH5055 (trade names, manufactured by Nippon Zeon Co., Ltd.).

Examples of poly vinyl chlorides include G351 and G576 (trade names, manufactured by Nippon Zeon Co., Ltd.); VINYBLAN 240, 270, 277, 375, 386, 609, 550, 601, 602, 630, 660, 671, 683, 680, 680S, 681N, 685R, 277, 380, 381, 410, 430, 432, 860, 863, 865, 867, 900, 900GT, 938 and 950 (trade names, manufactured by Nissin Chemical Industry Co., Ltd.).

Examples of polyvinylidene chlorides include L502 and L513 (trade names, manufactured by Asahi Kasei Corporation); D-5071 (trade name, manufactured by Dai-Nippon Ink & Chemicals, Inc.).

Examples of the polyolefins include Chemipearl S120, SA100, and V300 (P-40: Tg 80° C.) (trade names, manufactured by Mitsui Petrochemical); Voncoat 2830, 2210, and 2960 (trade names, manufactured by Dainippon Ink and Chemicals, Incorporated); Zaikusen and Ceporjon G (trade names, manufactured by Sumitomo Seika Chemicals Co., Ltd.).

Examples of the copolymer nylons include Ceporjon PA (trade name, manufactured by Sumitomo Seika Chemicals Co., Ltd.).

Examples of the polyvinyl acetates include VINYBLAN 1080, 1082, 1085W, 1108W, 1108S, 1563M, 1566, 1570, 1588C, A22J7-F2, 1128C, 1137, 1138, A20J2, A23J1, A23J1, A23K1, A23P2E, A68J1N, 1086A, 1086, 1086D, 1108S, 1187, 1241LT, 1580N, 1083, 1571, 1572, 1581, 4465, 4466, 4468W, 4468S, 4470, 4485LL, 4495LL, 1023, 1042, 1060, 1060S, 1080M, 1084W, 1084S, 1096, 1570K, 1050, 1050S, 3290, 1017AD, 1002, 1006, 1008, 1107L, 1225, 1245L, GV-6170, GV-6181, 4468W, and 4468S (trade names, manufactured by Nisshin Chemical Industry Co., Ltd.).

In addition to the latex polymer, any other polymers may be used in combination with the polymer for use in the present invention. Preferred the other polymers that can be used in combination are transparent or semitransparent, and generally colorless. Examples of the polymers include natural resins, polymers, or copolymers; synthetic resins, polymers, or copolymers; and other film-forming materials, such as gelatins, polyvinyl alcohols, hydroxyethyl celluloses, cellulose acetates, cellulose acetate butyrates, polyvinyl pyrrolidones, caseins, starches, polyacrylic acids, polymethylmethacrylic acids, polyvinyl chlorides, polymethacrylic acids, styrene-maleic anhydride copolymers, styrene-acrylonitrile copolymers, styrene-butadiene copolymers, polyvinyl acetals (e.g., polyvinyl formal and polyvinyl butyral), polyesters, polyurethanes, phenoxy resins, polyvinylidene chlorides, polyepoxides, polycarbonates, polyvinyl acetates, polyolefins, and polyamides.

In the present invention, the above polymers are preferably used as a binder in the receptor layer. The glass transition temperature (Tg) of the binder that can be used in the receptor layer is preferably in the range of −30° C. to 70° C., more preferably −10° C. to 50° C., still more preferably 0° C. to 40° C., in view of film-forming properties (brittleness for working) and image preservability. A blend of two or more types of polymers can be used as the binder. When a blend of two or more polymers is used, the average Tg obtained by summing up the Tg of each polymer weighted by its proportion, is preferably within the foregoing range. Also, when phase separation occurs or when a core-shell structure is adopted, the weighted average Tg is preferably within the foregoing range.

The glass transition temperature (Tg) is calculated according to the following equation:

$$1/Tg = \Sigma(Xi/Tgi)$$

wherein, assuming that the polymer is a copolymer composed of n monomers from i=1 to i=n, Xi is a weight fraction of the i-th monomer ($\Sigma Xi=1$) and Tgi is glass transition temperature (measured in absolute temperature) of a homopolymer formed from the i-th monomer. The symbol $\Sigma$ means the sum of i=1 to i=n. The value of the glass transition temperature of a homopolymer formed from each monomer (Tgi) is adopted from J. Brandrup and E. H. Immergut, "Polymer Handbook, 3rd. Edition", Wiley-Interscience (1989).

Hereinafter, the coating composition of the present invention is explained.

(Coating Composition)

The coating composition of the present invention is particularly preferably used for forming the receptor layer. The receptor layer performs functions of receiving dyes transferred from an ink sheet and retaining images formed by these dyes. Therefore, a resin that is easily dyed (a receptor polymer capable of being dyed) is used in the receptor layer.

The coating composition of the present invention contains a polymer having the above-described repeating unit derived from a monomer represented by formula (1). The polymer preferably functions as the receptor polymer capable of being dyed. Accordingly, in the present invention, it is preferable that the aforementioned coating composition is coated to form the receptor layer.

In the present invention, the receptor layer may be formed by coating with using an organic coating solution made of an organic solvent, such as methyl ethyl ketone and toluene, (in which the content of water in the solvent in the coating solution is less than 60 mass %, preferably less than 50 mass %, more preferably less than 40 mass %, and still more preferably less than 20 mass %); or using an aqueous coating solution made of an aqueous-type solvent. Further, it is preferable to prepare the receptor layer by applying the coating solution and then drying it.

The "aqueous type" so-called here means that 60% by mass or more of the solvent (dispersion medium) of the coating solution is water. As a component other than water in the coating solution, a water miscible organic solvent may be used, such as alcohols (for example, methyl alcohol, ethyl alcohol, isopropyl alcohol, diacetone alcohol, furfuryl alcohol, benzyl alcohol, diethylene glycol monoethyl ether, and oxyethyl phenyl ether); cellosolves (for example, methyl cellosolve, and ethyl cellosolve); dimethylformamide and ethyl acetate. In this case, the amount of water-miscible organic solvent added is preferably below 50 mass %, more preferably below 30 mass %, of the total solvents.

The polymer for use in the present invention may be dissolved or dispersed in a water or in an organic solvent, or may be in the form of an emulsion.

The degree of capability of being dyed is defined as follows. Four colors, specifically, yellow, magenta, cyan and black are output so as to form a solid image having 256 gradations on an image-receiving sheet, and the reflection density of the resulting image is measured to define a polymer providing an image having the highest reflection density as a receptor polymer having good capability of being dyed. It is necessary to pay special attention to the capability of being dyed of the receptor polymer because it varies depending on the type of printer and the type of ink sheet.

Specifically, it is preferable to use the coating composition containing the polymer for use in the present invention.

<Ultraviolet Absorber>

Also, in the present invention, in order to improve light resistance, an ultraviolet absorber may be added to the receptor layer. In this case, when this ultraviolet absorber is made to have a higher molecular weight, it can be secured to the receptor layer so that it can be prevented, for instance, from being diffused into the ink sheet and from being sublimated and vaporized by heating.

As the ultraviolet absorber, compounds having various ultraviolet absorber skeletons, which are widely used in the field of information recording, may be used. Specific examples of the ultraviolet absorber may include compounds having a 2-hydroxybenzotriazole type ultraviolet absorber skeleton, 2-hydroxybenzotriazine type ultraviolet absorber skeleton, or 2-hydroxybenzophenon type ultraviolet absorber skeleton. Compounds having a benzotriazole-type or triazine-type skeleton are preferable from the viewpoint of ultraviolet absorbing ability (absorption coefficient) and stability, and compounds having a benzotriazole-type or benzophenone-type skeleton are preferable from the viewpoint of obtaining a higher-molecular weight and using in a form of a latex. Specifically, ultraviolet absorbers described in, for example, JP-A-2004-361936 may be used.

The ultraviolet absorber preferably absorbs light at wavelengths in the ultraviolet region, and the absorption edge of the absorption of the ultraviolet absorber is preferably out of the visible region. Specifically, when it is added to the receptor layer to form a heat-sensitive transfer image-receiving sheet, the heat-sensitive transfer image-receiving sheet has a reflection density of, preferably, Abs 0.5 or more at 370 nm, and more preferably Abs 0.5 or more at 380 nm. Also, the heat-sensitive transfer image-receiving sheet has a reflection density of, preferably, Abs 0.1 or less at 400 nm. If the reflection density at a wavelength range exceeding 400 nm is high, it is not preferable because an image is made yellowish.

In the present invention, the ultraviolet absorber is preferably made to have a higher molecular weight. The ultraviolet absorber has a mass average molecular weight of preferably 10,000 or more, and more preferably 100,000 or more. As a means of obtaining a higher-molecular weight ultraviolet absorber, it is preferable to graft an ultraviolet absorber on a polymer. The polymer as the principal chain preferably has a polymer skeleton less capable of being dyed than the receptor polymer to be used together. Also, when the polymer is used to form a film, the film preferably has sufficient film strength. The graft ratio of the ultraviolet absorber to the polymer principal chain is preferably 5 to 20% by mass and more preferably 8 to 15% by mass.

Also, it is more preferable that the ultraviolet-absorber-grafted polymer is made to be used in a form of a latex. When the polymer is made to be used in a form of a latex, an aqueous dispersion-system coating solution may be used in application and coating to form the receptor layer, and this enables reduction of production cost. As a method of making the latex polymer (or making the polymer latex-wise), a method described in, for example, Japanese Patent No. 3450339 may be used. As the ultraviolet absorber to be used in a form of a latex, the following commercially available ultraviolet absorbers may be used which include ULS-700, ULS-1700, ULS-1383MA, ULS-1635 MH, XL-7016, ULS-933LP, and ULS-935LH, manufactured by Ipposha Oil Industries Co., Ltd.; and New Coat UVA-1025W, New Coat UVA-204W, and New Coat UVA-4512M, manufactured by Shin-Nakamura Chemical Co., Ltd. (all of these names are trade names).

In the case of using an ultraviolet-absorber-grafted polymer in a form of a latex, it may be mixed with a latex of the receptor polymer capable of being dyed, and the resulting mixture is coated. By doing so, a receptor layer, in which the ultraviolet absorber is homogeneously dispersed, can be formed.

The addition amount of the ultraviolet-absorber-grafted polymer or its latex is preferably 5 to 50 parts by mass, and more preferably 10 to 30 parts by mass, to 100 parts by mass of the receptor polymer capable of being dyed to be used to form the receptor layer.

<Releasing Agent>

Also, a releasing agent may be compounded in the receptor layer, in order to prevent thermal fusion with the heat-sensitive transfer sheet when an image is formed. As the releasing agent, a silicone oil, a phosphate-based plasticizer, or a fluorine-series compound may be used, and the silicone oil is particularly preferably used.

As the silicone oil, modified silicone oil, such as epoxy-modified, alkyl-modified, amino-modified, carboxyl-modified, alcohol-modified, fluorine-modified, alkyl aralkyl polyether-modified, epoxy/polyether-modified, or polyether-modified silicone oil, is preferably used. Among these, a reaction product between vinyl-modified silicone oil and hydrogen-modified silicone oil is preferable. The amount of the releasing agent is preferably 0.2 to 30 parts by mass, per 100 parts by mass of the receptor polymer.

It is preferable that the receptor layer further contains an antioxidant and other ingredients; therefore such ingredients and the aforementioned compounds may be mixed in the coating composition of the present invention.

The amount of the receptor layer to be applied is preferably 0.5 to 10 g/m$^2$ (solid basis, hereinafter, the amount to be applied in the present specification means a value on solid basis unless otherwise noted). The film thickness of the receptor layer is preferably 1 to 20 μm.

(Intermediate Layer <Undercoat Layer>)

An undercoat layer is preferably formed between the receptor layer and the support. As the undercoat layer, for example, a white background controlling layer, a charge controlling layer, an adhesive layer, and a primer layer can be formed. These layers may be formed in the same manner as those described in, for example, each specification of Japanese Patent Nos. 3585599 and 2925244.

(Intermediate Layer <Heat Insulation Layer>)

A heat insulation layer (foaming layer) serves to protect the support from heat when a thermal head is used to carry out a transfer operation under heating. Also, because the heat insulation layer generally has high cushion characteristics, a heat-sensitive transfer image-receiving sheet having high printing sensitivity can be obtained even in the case of using paper as a substrate (support).

The preferred heat insulation layer is composed of hollow polymer particles.

The hollow polymer particles in the present invention are polymer particles having independent pores inside of the particles. Examples of the hollow polymer particles include (1) non-foaming type hollow particles obtained in the following manner: a water is contained inside of a capsule wall formed of a polystyrene, acryl resin, or styrene/acryl resin and, after a coating solution is applied and dried, the water in the particles is vaporized out of the particles, with the result that the inside of each particle forms a hollow; (2) foaming type microballoons obtained in the following manner: a low-boiling point liquid such as butane and pentane is encapsulated in a resin constituted of any one of polyvinylidene chloride, polyacrylonitrile, polyacrylic acid and polyacrylate, and their mixture or polymer, and after the resin coating material is applied, it is heated to expand the low-boiling point liquid inside of the particles whereby the inside of each particle is made to be hollow; and (3) microballoons obtained by foaming the above (2) under heating in advance, to make hollow polymer particles.

These hollow polymer particles preferably have a hollow ratio of about 20 to 70%. The hollow polymer particles may be used two or more of hollow polymer particles may be blended, if necessary.

Specific examples of the above (I) include Rohpake 1055 manufactured by Rohm and Haas Co.; Boncoat PP-1000 manufactured by Dainippon Ink and Chemicals, Incorporated; SX866(B) manufactured by JSR Corporation; and Nippol MH5055 manufactured by Nippon Zeon (all of these product names are trade names). Specific examples of the above (2) include F-30 and F-50 manufactured by Matsumoto Yushi-Seiyaku Co., Ltd. (all of these product names are trade names). Specific examples of the above (3) include F-30E manufactured by Matsumoto Yushi-Seiyaku Co., Ltd, and Expancel 461DE, 551DE and 551DE20 manufactured by Nippon Ferrite (all of these product names are trade names).

A water-dispersible resin or water-soluble type resin is used as a binder resin, in the intermediate layer containing the hollow polymer particles. As the binder resin that can be used in the present invention, known resins such as an acryl resin, styrene/acryl copolymer, polystyrene resin, polyvinyl alcohol resin, vinyl acetate resin, ethylene/vinyl acetate copolymer, vinyl chloride/vinyl acetate copolymer, styrene/butadiene copolymer, polyvinylidene chloride resin, cellulose derivative, casein, starch, and gelatin may be used. Also, these resins may be used either singly or as mixtures.

The solid content of the hollow polymer particles in the intermediate layer preferably falls in a range from 5 to 2,000 parts by mass, assuming that the solid content of the binder resin be 100 parts by mass. Also, the ratio by mass of the solid content of the hollow polymer particles in the coating solution is preferably 1 to 70% by mass and more preferably 10 to 40% by mass. If the ratio of the hollow polymer particles is excessively low, sufficient heat insulation cannot be obtained, whereas if the ratio of the hollow polymer particles is excessively large, the adhesion between the hollow polymers particles is reduced, posing problems, for example, powder fall or film separation.

The particle size of the hollow polymer particles is preferably 0.1 to 20 μm, more preferably 0.1 to 2 μm, and particularly preferably 0.1 to 1 μm.

The glass transition temperature (Tg) of the hollow polymer particles is preferably 70° C. or more and more preferably 100° C. or more.

The heat insulation layer may be made of a resin and a foaming agent. As the resin for the heat insulation layer, known resins such as a urethane resin, acryl resin, methacryl resin and modified olefin resin or those obtained by blending these resins, may be used. Each of these resins is dissolved and/or dispersed in an organic solvent or water and the resulting solution is applied to form a heat insulation layer. The heat insulation layer coating solution is preferably an aqueous type coating solution having no influence on the foaming agent. As the coating solution, for example, a water-soluble, water-dispersible or SBR latex, emulsions including a urethane-series emulsion, polyester emulsion, emulsion of vinyl acetate and its copolymer, emulsion of a copolymer of acryl types such as acryl or acrylstyrene, vinyl chloride emulsion, or dispersions of these emulsions may be used. When a microsphere which will be explained later is used as the foaming agent, it is preferable to use an emulsion of vinyl acetate or its copolymer or an emulsion of a copolymer of acryl such as acryl or acrylstyrene.

The glass transition point, softness and filmforming characteristics of these resins can be easily controlled by changing the kind and ratio of the monomer to be copolymerized, and are therefore suitable in the point that desired characteristics are obtained even if a plasticizer and filming adjuvant are not added, that a film is reduced in a change in color when it is stored in various environments after formed, and that it is reduced in material properties with time. Also, among the above resins, a SBR latex is undesirable because it usually has a low glass transition point, tends to cause blocking and tends to be yellowed after a film is formed or while it is stored. A urethane-series emulsion is undesirable because many urethane emulsions contain solvents such as NMP and DMF and therefore tends to have an adverse influence on a foaming agent. A polyester emulsion or dispersion and a vinyl chloride emulsion are undesirable because they generally have high glass transition points, and cause a deterioration in the foaming characteristics of a microsphere. Though there are those which are soft, they are not used preferably because the softness is imparted by adding a plasticizer.

The foaming characteristics of the foaming agent are largely affected by the hardness of a resin. In order for the foaming agent to foam the resin at a desired expansion ratio, the resin is preferably those having a glass transition point of −30 to 20° C. or a minimum filmforming temperature (MFT) of 20° C. or less. Resins having a higher glass transition point lack in softness and cause a deterioration in the foaming characteristics of the foaming agent. Also, resins having a lower glass transition point give rise to blocking caused by adhesiveness (generated on the foaming layer and on the backside of the substrate when the substrate on which the foaming layer has been formed is rolled) and cause defects (for instance, when the image-receiving sheet is cut, the resin of the foaming layer adheres to a cutter blade, which deteriorates outward appearance or allows cutting dimension to be out of order). Also, resins of which the minimum filmforming temperature is too high cause filmforming inferiors during coating and drying, giving rise to disorders such as surface cracks.

Examples of the foaming agent include known foaming agents, for example, decomposition type foaming agents such as dinitropentamethylenetetramine, diazoaminobenzene, azobisisobutyronitrile and azodicarboamide, which are decomposed by heating to generate gases such as oxygen, carbonic acid gas or nitrogen; and microspheres obtained by encapsulating a low-boiling point liquid such as butane and pentane with a resin such as polyvinylidene chloride or polyacrylonitrile to form a microcapsule. Among these materials, microspheres obtained by encapsulating a low-boiling point liquid such as butane and pentane with a resin such as polyvinylidene chloride or polyacrylonitrile to form a microcapsule are preferably used. These foaming agents are respectively foamed by heating after the foam layer is formed, and the resulting foamed layer has high cushion characteristics and heat insulation characteristics. The amount of the foaming agent is preferably in a range from 0.5 to 100 parts by mass based on 100 parts by mass of the resin used to form the foaming layer. When the amount is too small, the cushion characteristics of the foaming layer are reduced and therefore, the effect of the foaming layer is not obtained. When the amount is too large, the hollow ratio of the foamed layer becomes so large that the mechanical strength of the foaming layer is reduced and the foaming layer cannot stand to usual handling. Also, the surface of the foaming layer loses smoothness, producing an adverse effect on the outward appearance and image quality. Also, the thickness of the whole foaming layer is preferably 30 to 100 μm. When the thickness is too thin, the foaming layer has insufficient cushion characteristics and heat insulation, whereas when the thickness is too thick, the effect of the foaming layer is not improved, bringing about reduced strength. Also, as to the particle diameter of the foaming agent, the volume average particle diameter of the foaming agent before the foaming layer is foamed is about 5 to 15 μm and the volume average particle diameter of the foaming agent after the foaming layer is foamed is 20 to 50 μm. Foaming agents having a small volume average particle diameter before foamed or foaming agents having a small volume average particle diameter after foamed, have a low cushion effect. Foaming agents having a large volume average particle diameter before foamed or foaming agents having a large volume average particle diameter after foamed, each make the surface of the foaming layer irregular, and eventually have an adverse influence on the quality of the formed image. Therefore, an amount out of the above range is undesirable.

It is particularly preferable to use, among the above foaming agents, a low-temperature foaming type micropsphere in which the softening point of the capsule wall and foaming start temperature are respectively 100° C. or less, and which has an optimum foaming temperature (temperature at which the expansion ratio is highest when a heating time is one minute) of 140° C. or less, and to make the heating temperature as low as possible when the foaming agent is foamed. The use of a microsphere having a lower foaming temperature makes it possible to prevent thermal wrinkles and curling of the substrate. This microsphere having a low foaming temperature can be obtained by controlling the amount of a thermoplastic resin such as polyvinylidene chloride and polyacrilonitrile which forms the capsule wall. The volume average particle diameter is preferably 5 to 15 μm. The foam layer formed using this microsphere has the advantages that air cells obtained by forming are closed cells, the foam layer is foamed using a simple process using only heating and the thickness of the foaming layer can be easily controlled by the amount of the microsphere to be compounded.

However, this microsphere is not resistant to an organic solvent. When a coating solution using an organic solvent is used for the foaming layer, the capsule wall of the microsphere is eroded, resulting in low foaming characteristics. Therefore, when a microsphere like the above is used, it is desirable to use an aqueous type coating solution that does not contain organic solvents, for example, ketones such as acetone and methyl ethyl ketone, esters such as ethyl acetate and lower alcohols such as methanol and ethanol which erode the capsule wall. Accordingly, it is desirable to use an aqueous type coating solution, specifically, a solution using a water-soluble or water-dispersible resin or a resin emulsion and preferably an acrylstyrene emulsion or modified vinyl acetate emulsion. Also, even if an aqueous type coating solution is used to form a foaming layer, a coating solution formulated with a high-boiling point and highly polar solvent such as NMP, DMF or cellosolve as a cosolvent, a filmforming auxiliary, or a plasticizer has an adverse influence on the microsphere. It is therefore necessary to take it into account, for example, to seize the composition of the aqueous resin to be used and the amount of the high-boiling point solvent to be added, to thereby confirm whether the microcapsule is adversely affected or not.

The intermediate layer (containing the under coat layer and the heat insulation layer) preferably contains a gelatin. The amount of the gelatin in the coating solution for the intermediate layer is preferably 0.5 to 14% by mass, and particularly preferably 1 to 6% by mass. Also, the coating amount of the above hollow polymer particles in the intermediate layer is preferably 1 to 100 g/m$^2$, and more preferably 5 to 20 g/m$^2$.

A thickness of the intermediate layer containing the hollow polymer particles is preferably from 5 to 50 μm, more preferably from 5 to 40 μm.

(Support)

As the support, coated paper, WP paper (double side laminated paper) or the like may be used.

—Coated Paper—

The coated paper is paper obtained by coating a sheet such as base paper with various resins, rubber latexes, or high-molecular materials, on one side or both sides of the sheet, wherein the coating amount differs depending on its use. Examples of such coated paper include art paper, cast coated paper, and Yankee paper.

It is proper to use a thermoplastic resin as the resin to be applied to the surface(s) of the base paper and the like. As such a thermoplastic resin, the following thermoplastic resins (A) to (H) may be exemplified.

(A) Polyolefin resins such as polyethylene resin and polypropylene resin; copolymer resins composed of an olefin such as ethylene or propylene and another vinyl monomer; and acrylic resins.
(B) Thermoplastic resins having an ester linkage: for example, polyester resins obtained by condensation of a dicarboxylic acid component (such a dicarboxylic acid component may be substituted with a sulfonic acid group, a carboxyl group, or the like) and an alcohol component (such an alcohol component may be substituted with a hydroxyl group, or the like); polyacrylate resins or polymethacrylate resins such as polymethylmethacrylate, polybutylmethacrylate, polymethylacrylate, polybutylacrylate, or the like; polycarbonate resins, polyvinyl acetate resins, styrene acrylate resins, styrene-methacrylate copolymer resins, vinyltoluene acrylate resins, or the like.

Concrete examples of them are those described in JP-A-59-101395, JP-A-63-7971, JP-A-63-7972, JP-A-63-7973, and JP-A-60-294862.

Commercially available thermoplastic resins usable herein are, for example, Vylon 290, Vylon 200, Vylon 280, Vylon 300, Vylon 103, Vylon GK-140, and Vylon GK-130 (products of Toyobo Co., Ltd.); Tafton NE-382, Tafton U-5, ATR-2009, and ATR-2010 (products of Kao Corporation); Elitel UE 3500, UE 3210, XA-8153, KZA-7049, and KZA-1449 (products of Unitika Ltd.); and Polyester TP-220 and R-188 (products of The Nippon Synthetic Chemical Industry Co., Ltd.); and thermoplastic resins in the Hyros series from Seiko Chemical Industries Co., Ltd., and the like (all of these names are trade names).

(C) Polyurethane resins, etc.
(D) Polyamide resins, urea resins, etc.
(E) Polysulfone resins, etc.
(F) Polyvinyl chloride resins, polyvinylidene chloride resins, vinyl chloride/vinyl acetate copolymer resins, vinyl chloride/vinyl propionate copolymer resins, etc.
(G) Polyol resins such as polyvinyl butyral; and cellulose resins such as ethyl cellulose resin and cellulose acetate resin.
(H) Polycaprolactone resins, styrene/maleic anhydride resins, polyacrylonitrile resins, polyether resins, epoxy resins, and phenolic resins.

The thermoplastic resins may be used either alone or in combination of two or more.

The thermoplastic resin may contain a whitener, a conductive agent, a filler, a pigment or dye including, for example, titanium oxide, ultramarine blue, and carbon black; or the like, if necessary.

—Laminated Paper—

The laminated paper is a paper which is formed by laminating various kinds of resin, rubber, polymer sheets or films on a sheet such as a base paper or the like. Specific examples of the materials useable for the lamination include polyolefins, polyvinyl chlorides, polyethylene terephthalates, polystyrenes, polymethacrylates, polycarbonates, polyimides, and triacetylcelluloses. These resins may be used alone, or in combination of two or more.

Generally, the polyolefins are prepared by using a low-density polyethylene. However, for improving the thermal resistance of the support, it is preferred to use a polypropylene, a blend of a polypropylene and a polyethylene, a high-density polyethylene, or a blend of a high-density polyethylene and a low-density polyethylene. From the viewpoint of cost and its suitableness for the laminate, it is preferred to use the blend of a high-density polyethylene and a low-density polyethylene.

The blend of a high-density polyethylene and a low-density polyethylene is preferably used in a blend ratio (a mass ratio) of 1/9 to 9/1, more preferably 2/8 to 8/2, and most preferably 3/7 to 7/3. When the thermoplastic resin layer is formed on the both surfaces of the support, the back side of the support is preferably formed using, for example, the high-density polyethylene or the blend of a high-density polyethylene and a low-density polyethylene. The molecular weight of the polyethylenes is not particularly limited. Preferably, both of the high-density polyethylene and the low-density polyethylene have a melt index of 1.0 to 40 g/10 minute and a high extrudability.

The sheet or film may be subjected to a treatment to impart white reflection thereto. As a method of such a treatment, for example, a method of incorporating a pigment such as titanium oxide into the sheet or film can be mentioned.

The thickness of the support is preferably from 25 μm to 300 μm, more preferably from 50 μm to 260 μm, and further preferably from 75 μm to 220 μm. The support can have any rigidity according to the purpose. When it is used as a support for electrophotographic image-receiving sheet of photographic image quality, the rigidity thereof is preferably near to that in a support for use in color silver halide photography.

(Curling Control Layer)

When the support is exposed as it is, there is the case where the heat-sensitive transfer image-receiving sheet is made to curl by moisture and/or temperature in the environment. It is therefore preferable to form a curling control layer on the backside of the support. The curling control layer not only prevents the image-receiving sheet from curling but also has a water-proof function. For the curling control layer, a polyethylene laminate, a polypropylene laminate or the like is used. Specifically, the curling control layer may be formed in a manner similar to those described in, for example, JP-A-61-110135 and JP-A-6-202295.

(Writing Layer and Charge Controlling Layer)

For the writing layer and the charge control layer, an inorganic oxide colloid, an ionic polymer, or the like may be used. As the antistatic agent, any antistatic agents including cationic antistatic agents such as a quaternary ammonium salt and polyamine derivative, anionic antistatic agents such as alkyl phosphate, and nonionic antistatic agents such as fatty acid ester may be used. Specifically, the writing layer and the charge control layer may be formed in a manner similar to those described in the specification of Japanese Patent No. 3585585.

The heat-sensitive transfer image-receiving sheet of the present invention is preferably formed, by applying at least one receptor layer and at least one intermediate layer, on a support, through simultaneous multi-layer coating.

It is known that in the case of producing an image-receiving sheet composed of plural layers having different functions from each other (for example, an air cell layer, a heat insulation layer, an intermediate layer and a receptor layer) on a support, it may be produced by applying each layer successively one by one, or by overlapping the layers each already coated on a support or substrate, as shown in, for example, JP-A-2004-106283, JP-A-2004-181888 and JP-A-2004-345267. It has been known in photographic industries, on the other hand, that productivity can be greatly improved, for example, by providing plural layers through simultaneous multi-layer coating. For example, there are known methods such as the so-called slide coating (slide coating method) and curtain coating (curtain coating method) as described in, for example, U.S. Pat. Nos. 2,761,791, 2,681,234, 3,508,947, 4,457,256 and 3,993,019; JP-A-63-54975, JP-A-61-278848, JP-A-55-86557, JP-A-52-31727, JP-A-55-142565, JP-A-50-43140, JP-A-63-80872, JP-A-54-54020, JP-A-5-104061, JP-A-5-127305, and JP-B-49-7050; and Edgar B. Gutoff, et al., "Coating and Drying Defects: Troubleshooting Operating Problems", John Wiley & Sons Company, 1995, pp. 101-103.

The plural layers in the present invention are structured using resins as its major components. Coating solutions forming each layer are preferably water-dispersible latexes. The solid content by mass of the resin put in a latex state in each layer coating solution is preferably in a range from 5 to 80% and particularly preferably 20 to 60%. The average particle size of the resin contained in the above water-dispersed latex is preferably 5 μm or less and particularly preferably 1 μm or less. The above water-dispersed latex may contain a known additive, such as a surfactant, a dispersant, and a binder resin, according to the need.

In the present invention, it is preferred that a laminate composed of plural layers be formed on a support and solidified just after the forming, according to the method described in U.S. Pat. No. 2,761,791. For example, in the case of solidifying a multilayer structure by using a resin, it is preferable to raise the temperature immediately after the plural layers are formed on the support. Also, in the case where a binder (e.g., a gelatin) to be gelled at lower temperatures is contained, there is the case where it is preferable to drop the temperature immediately after the plural layers are formed on the support.

In the present invention, the coating amount of a coating solution per one layer constituting the multilayer is preferably in a range from 1 g/m$^2$ to 500 g/m$^2$. The number of layers in the multilayer structure may be arbitrarily selected from a number of 2 or more. The receptor layer is preferably disposed as a layer most apart from the support.

A heat-sensitive transfer sheet (ink sheet) used in combination with the heat-sensitive transfer image-receiving sheet according to the present invention as mentioned above at the time of formation of heat transfer image is preferably a sheet having on a support a dye layer containing a diffusion-transfer dye, and any ink sheet can be used as the sheet. As a means for providing heat energy in the thermal transfer, any of the conventionally known providing means may be used. For example, application of a heat energy of about 5 to 100 mJ/mm$^2$ by controlling recording time in a recording device such as a thermal printer (trade name: Video Printer VY-100, manufactured by Hitachi, Ltd.), sufficiently attains the expected result.

Also, the heat-sensitive transfer image-receiving sheet of the present invention may be used in various applications enabling thermal transfer recording, such as heat-sensitive transfer image-receiving sheets in a form of thin sheets (cut sheets) or rolls; cards; and transmittable type manuscript-making sheets, by optionally selecting the type of support.

According to the present invention, it is possible to provide a heat-sensitive transfer image-receiving sheet, which has a high sensitivity and excellent image preservability. Further, according to the present invention, it is also possible to provide a coating composition making it possible to produce a heat-sensitive transfer image-receiving sheet having such properties through a simple procedure.

The present invention will be described in more detail based on the following examples, but the invention is not intended to be limited thereto.

EXAMPLES

Example 1

(Preparation of Ink Sheet)

A polyester film 6.0 μm in thickness (trade name: Lumirror, manufactured by Toray Industries, Inc.) was used as the substrate film. A heat-resistant slip layer (thickness: 1 μm) was formed on the back side of the film, and the following yellow, magenta, and cyan compositions were respectively applied as a monochromatic layer (coating amount: 1 g/m$^2$ after drying) on the front side.

| Yellow composition | |
|---|---|
| Dye (trade name: Macrolex Yellow 6G, manufactured by Byer) | 5.5 parts by mass |
| Polyvinylbutyral resin (trade name: S-LEC BX-1, manufactured by Sekisui Chemical Co., Ltd.) | 4.5 parts by mass |
| Methyl ethyl ketone/toluene (1/1, at mass ratio) | 90 parts by mass |

| Magenta composition | |
|---|---|
| Magenta dye (trade name; Disperse Red 60) | 5.5 parts by mass |
| Polyvinylbutyral resin (trade name: S-LEC BX-1, manufactured by Sekisui Chemical Co., Ltd.) | 4.5 parts by mass |
| Methyl ethyl ketone/toluene (1/1, at mass ratio) | 90 parts by mass |

| Cyan composition | |
|---|---|
| Cyan dye (trade name; Solvent Blue 63) | 5.5 parts by mass |
| Polyvinylbutyral resin (trade name: S-LEC BX-1, manufactured by Sekisui Chemical Co., Ltd.) | 4.5 parts by mass |
| Methyl ethyl ketone/toluene (1/1, at mass ratio) | 90 parts by mass |

(Preparation of Polymer)

(1-1) Preparation of Exemplified Polymer P-1

Into a reaction vessel equipped with a stirrer and a reflex cooler, were charged 500 g of distilled water, 180 g of styrene, 120 g of the exemplified monomer A-35, 12 g of PIONINE A-43-S (trade name, manufactured by Takemoto Oil & Fat Co., Ltd.), and 2.25 g of ammonium peroxodisulfate (APS) (manufactured by Wako Pure Chemical Industries, Ltd.), and then the mixture was heated to 70° C. for 6 hours under the atmosphere of nitrogen, so as to complete the reaction. Then, the solvent was removed by freeze drying. The powder thus obtained was thoroughly washed with distilled water, and then dried. Thus, the exemplified polymer P-1 was obtained, and the mass average molecular weight thereof was $0.95 \times 10^5$.

(1-2) Preparation of Exemplified Polymer P-3

Into a reaction vessel equipped with a stirrer and a reflex cooler, were charged 500 g of distilled water, 115 g of styrene, 60 g of acrylonitrile, 135 g of the exemplified monomer A-30, 12 g of PIONINE A-43-S (trade name, manufactured by Takemoto Oil & Fat Co., Ltd.), and 2.25 g of ammonium peroxodisulfate (APS) (manufactured by Wako Pure Chemical Industries, Ltd.), and then the mixture was heated to 70° C. for 6 hours under the atmosphere of nitrogen, so as to complete the reaction. Then, the solvent was removed by freeze drying. The powder thus obtained was thoroughly washed with distilled water, and then dried. Thus, the exemplified polymer P-3 was obtained, and the mass average molecular weight thereof was $0.55 \times 10^5$.

(1-3) Preparation of Exemplified Polymer P-7

Into a reaction vessel equipped with a stirrer and a reflex cooler, were charged 500 g of distilled water, 54 g of styrene, 60 g of acrylonitrile, 150 g of 2-ethylhexyl acrylate, 30 g of the exemplified monomer A-35, 6 g of acrylic acid, 12 g of PIONINE A-43-S (trade name, manufactured by Takemoto Oil & Fat Co., Ltd.), and 2.25 g of ammonium peroxodisulfate (APS) (manufactured by Wako Pure Chemical Industries, Ltd.), and then the mixture was heated to 70° C. for 6 hours under the atmosphere of nitrogen, so as to complete the reaction. Then, the solvent was removed by freeze drying. The powder thus obtained was thoroughly washed with distilled water, and then dried. Thus, the exemplified polymer P-7 was obtained, and the mass average molecular weight thereof was $2.65 \times 10^5$.

(1-4) Preparation of Exemplified Polymer P-9

Into a reaction vessel equipped with a stirrer and a reflex cooler, were charged 500 g of distilled water, 54 g of styrene, 60 g of methyl methacrylate, 165 g of dodecyl acrylate, 15 g of the exemplified monomer A-23, 6 g of acrylic acid, 12 g of PIONNE A-43-S (trade name, manufactured by Takemoto Oil & Fat Co., Ltd.), and 2.25 g of APS, and then the mixture was heated to 70° C. for 6 hours under the atmosphere of nitrogen, so as to complete the reaction. Then, the solvent was removed by freeze drying. The powder thus obtained was thoroughly washed with distilled water, and then dried. Thus, the exemplified polymer P-9 was obtained, and the mass average molecular weight thereof was $2.2 \times 10^5$.

(1-5) Preparation of Exemplified Polymer P-26

200 g of methylethylketone (MEK), 50 g of styrene, 30 g of acrylonitrile, 60 g of benzyl methacrylate, 20 g of 2-ethylhexyl acrylate and 40 g of the exemplified monomer A-29 were mixed, to prepare a monomer solution. 60 g of the monomer solution was placed in a reaction vessel equipped with a stirrer and a reflex cooler, and then the solution was heated to 75° C. under the atmosphere of nitrogen. 2.4 g of 2,2'-azobis(2,4'-dimethylvaleronitrile) (V65: manufactured by Wako Pure Chemical Industries) was added to the rest of the monomer solution, and the mixture was added dropwise into the reaction vessel over 1 hour. Two hours after completion of the dropwise addition, a solution of 2.4 g of V65 dissolved in 24 g of MEK was added thereto dropwise over 3 hours, and then the mixture was heated at 75° C. for 2 hours and further heated at 80° C. for 2 hours, to obtain a copolymer solution. The reaction solution obtained was reprecipitated twice in a large excess amount of n-hexane, and the precipitated polymer was dried. Thus, the exemplified polymer P-26 was obtained, and the mass average molecular weight thereof was $0.65 \times 10^5$.

(1-6) Preparation of Exemplified Polymer P-28

200 g of methylethylketone (MEK), 60 g of styrene, 30 g of acrylonitrile, 40 g of methyl methacrylate and 70 g of the exemplified monomer A-29 were mixed, to prepare a monomer solution. 60 g of the monomer solution was placed in a reaction vessel equipped with a stirrer and a reflex cooler, and then the solution was heated to 75° C. under the atmosphere of nitrogen. 2.4 g of 2,2'-azobis(2,4'-dimethylvaleronitrile) (V65: manufactured by Wako Pure Chemical Industries) was added to the rest of the monomer solution, and the mixture was added dropwise into the reaction vessel over 1 hour. Two hours after completion of the dropwise addition, a solution of 2.4 g of V65 dissolved in 24 g of MEK was added thereto dropwise over 3 hours, and then the mixture was heated at 75° C. for 2 hours and further heated at 80° C. for 2 hours, to obtain a copolymer solution. The reaction solution obtained was reprecipitated twice in a large excess amount of n-hexane, and the precipitated polymer was dried. Thus, the exemplified polymer P-28 was obtained, and the mass average molecular weight thereof was $0.31 \times 10^5$.

(Preparation of Image-Receiving Sheet)

(2-1) Preparation of Sample 101 (Comparative example)

A paper support, on both sides of which polyethylene was laminated, was subjected to corona discharge treatment on the surface thereof, and then a gelatin undercoat layer containing sodium dodecylbenzenesulfonate was disposed on the treated surface. The intermediate layer A having the following composition was coated thereon by a bar coater and dried, and then the receptor layer A1 having the following composition was further coated by a bar coater and dried. The bar coater coating was performed at 40° C. The drying for each layer was performed at 50° C. for 16 hours. The coating was performed so that coating amounts of the intermediate layer A and the receptor layer A1 after drying would be 1.0 g/m² and 3.0 g/m², respectively.

| Intermediate layer A | |
| --- | --- |
| Polyester resin (Trade name: Vylon 200, manufactured by Toyobo Co., Ltd.) | 10 parts by mass |
| Fluorescent whitening agent (Trade name: Uvitex OB, manufactured by Ciba Specialty Chemicals) | 1 part by mass |
| Titanium oxide | 30 parts by mass |
| Methyl ethyl ketone/toluene (=1/1, at mass ratio) | 90 parts by mass |

| Receptor layer A1 | |
| --- | --- |
| Polyester resin (the resin described in Example 1 of JP-A-2-265789) | 100 parts by mass |
| Amino-modified silicone (Trade name: X-22-3050C, manufactured by Shin-Etsu Chemical Co., Ltd.) | 5 parts by mass |
| Epoxy-modified silicone (Trade name: X-22-300E, manufactured by Shin-Etsu Chemical Co., Ltd.) | 5 parts by mass |
| Methyl ethyl ketone/toluene (=1/1, at mass ratio) | 400 parts by mass |

(2-2) Preparation of Sample 102 (Comparative example)

A paper support, on both sides of which polyethylene was laminated, was subjected to corona discharge treatment on the surface thereof, and then a gelatin undercoat layer containing sodium dodecylbenzenesulfonate was disposed on the treated surface. The intermediate layer A having the following composition was coated thereon by a bar coater and dried, and then the receptor layer A2 having the following composition was further coated by a bar coater and dried. The bar coater coating was performed at 40° C. The drying for each layer was performed at 50° C. for 16 hours. The coating was performed so that coating amounts of the intermediate layer A and the receptor layer A2 after drying would be 1.0 g/m² and 3.0 g/m², respectively.

| Intermediate layer A | |
| --- | --- |
| Polyester resin (Trade name: Vylon 200, manufactured by Toyobo Co., Ltd.) | 10 parts by mass |
| Fluorescent whitening agent (Trade name: Uvitex OB, manufactured by Ciba Specialty Chemicals) | 1 parts by mass |
| Titanium oxide | 30 parts by mass |
| Methyl ethyl ketone/toluene (=1/1, at mass ratio) | 90 parts by mass |

| Receptor layer A2 | |
| --- | --- |
| Copolymer of phenoxyethyl methacrylate/styrene = 95/5 (the resin described in Example 1 of the Japanese Patent No. 3604187) | 100 parts by mass |
| Amino-modified silicone (Trade name: X-22-3050C, manufactured by Shin-Etsu Chemical Co., Ltd.) | 5 parts by mass |
| Epoxy-modified silicone (Trade name: X-22-300E, manufactured by Shin-Etsu Chemical Co., Ltd.) | 5 parts by mass |
| Methyl ethyl ketone/toluene (=1/1, at mass ratio) | 400 parts by mass |

(2-3) Preparation of Sample 103 (Comparative example)

A paper support, on both sides of which polyethylene was laminated, was subjected to corona discharge treatment on the surface thereof, and then a gelatin undercoat layer containing sodium dodecylbenzenesulfonate was disposed on the treated surface. The intermediate layer B and the receptor layer B each having the following composition were multi-layer-coated on the gelatin undercoat layer, in the state that the intermediate layer B and the receptor layer B were laminated in this order from the side of the support, by the method as described in FIG. 9 in U.S. Pat. No. 2,761,791. Immediately after the coating, the layers were dried at 50° C. for 16 hours. The coating was performed so that coating amounts of the intermediate layer B and the receptor layer B after drying would be 15 g/m² and 3.0 g/m², respectively.

| Intermediate layer B | |
| --- | --- |
| Hollow latex polymer (Trade name: MH5055, manufactured by Nippon Zeon Co., Ltd.) | 563 parts by mass |
| Gelatin | 120 parts by mass |

Here, the hollow latex polymer was an aqueous dispersion of a polymer having an outside diameter of 0.5 µm and a hollow structure.

| Receptor layer B | |
| --- | --- |
| Vinyl chloride-series resin (Trade name: VINYBLAN 609, manufactured by Nissin Chemical Industry Co., Ltd.) | 100 parts by mass |
| Amino-modified silicone (Trade name: X-22-3050C, manufactured by Shin-Etsu Chemical Co., Ltd.) | 5 parts by mass |
| Epoxy-modified silicone (Trade name: X-22-300E, manufactured by Shin-Etsu Chemical Co., Ltd.) | 5 parts by mass |
| Methyl ethyl ketone/toluene (=1/1, at mass ratio) | 400 parts by mass |

(2-4) Preparation of Sample 104 (This invention)

Sample 104 was prepared by multi-layer coating in the same manner as Sample 103, except that the receptor layer B was replaced with the receptor layer C having the following composition. Immediately after the coating, the layers were dried at 50° C. for 16 hours. The coating was performed so that coating amounts of the intermediate layer B and the receptor layer C after drying would be 15 g/m² and 3.0 g/m², respectively.

| Receptor layer C | |
| --- | --- |
| Polymer P-1 | 100 parts by mass |
| Amino-modified silicone (Trade name: X-22-3050C, manufactured by Shin-Etsu Chemical Co., Ltd.) | 5 parts by mass |
| Epoxy-modified silicone (Trade name: X-22-300E, manufactured by Shin-Etsu Chemical Co., Ltd.) | 5 parts by mass |
| Methyl ethyl ketone/toluene (=1/1, at mass ratio) | 400 parts by mass |

(2-5) Preparation of Sample 105 (This invention)

Sample 105 was prepared by multi-layer coating in the same manner as Sample 103, except that the receptor layer B was replaced with the receptor layer D having the following composition. Immediately after the coating, the layers were dried at 50° C. for 16 hours. The coating was performed so that coating amounts of the intermediate layer B and the receptor layer D after drying would be 15 g/m² and 3.0 g/m², respectively.

| Receptor layer D | |
|---|---|
| Polymer P-3 | 100 parts by mass |
| Amino-modified silicone | 5 parts by mass |
| (Trade name: X-22-3050C, manufactured by Shin-Etsu Chemical Co., Ltd.) | |
| Epoxy-modified silicone | 5 parts by mass |
| (Trade name: X-22-300E, manufactured by Shin-Etsu Chemical Co., Ltd.) | |
| Methyl ethyl ketone/toluene (=1/1, at mass ratio) | 400 parts by mass |

(2-6) Preparation of Sample 106 (This invention)

Sample 106 was prepared by multi-layer coating in the same manner as Sample 103, except that the receptor layer B was replaced with the receptor layer E having the following composition. Immediately after the coating, the layers were dried at 50° C. for 16 hours. The coating was performed so that coating amounts of the intermediate layer B and the receptor layer E after drying would be 15 g/m² and 3.0 g/m², respectively.

| Receptor layer E | |
|---|---|
| Polymer P-7 | 100 parts by mass |
| Amino-modified silicone | 5 parts by mass |
| (Trade name: X-22-3050C manufactured by Shin-Etsu Chemical Co., Ltd.) | |
| Epoxy-modified silicone | 5 parts by mass |
| (Trade name: X-22-300E, manufactured by Shin-Etsu Chemical Co., Ltd.) | |
| Methyl ethyl ketone/toluene (=1/1, at mass ratio) | 400 parts by mass |

(2-7) Preparation of Sample 107 (This invention)

Sample 107 was prepared by multi-layer coating in the same manner as Sample 103, except that the receptor layer B was replaced with the receptor layer F having the following composition. Immediately after the coating, the layers were dried at 50° C. for 16 hours. The coating was performed so that coating amounts of the intermediate layer B and the receptor layer F after drying would be 15 g/m² and 3.0 g/m², respectively.

| Receptor layer F | |
|---|---|
| Polymer P-9 | 100 parts by mass |
| Amino-modified silicone | 5 parts by mass |
| (Trade name: X-22-3050C, manufactured by Shin-Etsu Chemical Co., Ltd.) | |
| Epoxy-modified silicone | 5 parts by mass |
| (Trade name: X-22-300E, manufactured by Shin-Etsu Chemical Co., Ltd.) | |
| Methyl ethyl ketone/toluene (=1/1, at mass ratio) | 400 parts by mass |

(2-8) Preparation of Sample 108 (This invention)

Sample 108 was prepared in the same manner as Sample 107, except that the Polymer P-9 in the receptor layer F was replaced with the Polymer P-26 in an equivalent amount by mass.

(2-9) Preparation of Sample 109 (This invention)

Sample 109 was prepared in the same manner as Sample 107, except that the Polymer P-9 in the receptor layer F was replaced with the Polymer P-28 in an equivalent amount by mass.

(Image Formation)

The above-described ink sheet and the image-receiving sheets as Samples 101 to 109 were each worked to be made loadable in a sublimation printer, DPB 1500 (trade name, manufactured by Nidec Copal Corporation), and image outputs were produced on those image-receiving sheets. As output images, outputs of a black solid image were produced at the settings for attaining the maximum densities in a high-speed printing mode.

(Relative Transfer Density Evaluation)

The visual density of the black solid image obtained in the above condition was measured by Photographic Densitometer (trade name, manufactured by X-Rite Incorporated). The results are shown in Table 1 as relative values when the transfer density of Sample 101 was defined as 100.

(Evaluation of Loss of Image Definition)

Each image-receiving sheet on which image output had been produced was stored for one month in an incubator kept at 60° C., and loss of color-image definition was evaluated. An image-receiving sheet on which no loss of image definition was observed at all is rated as "A", an image-receiving sheet on which loss of image definition of a small degree was observed is rated as "B", and an image-receiving sheet on which loss of image definition of a large degree was observed is rated as "C".

(Lightfastness Evaluation)

Each image-receiving sheet on which image output had been produced was stored for two weeks under irradiation with a 20,000 lx fluorescent lamp tester, and lightfastness thereof was evaluated by a remaining ratio of dyes in the area with the initial reflection density (O.D.) of 1.0.

A: Remaining ratio of dyes ≧ 90%
B: 90% > Remaining ratio of dyes ≧ 75%
C: 75% > Remaining ratio of dyes

TABLE 1

| Sample No. | Relative transfer density | Loss of image definition | Light fastness | Remarks |
|---|---|---|---|---|
| 101 | 100 | A | B | Comparative example |
| 102 | 110 | B | A | Comparative example |
| 103 | 120 | B | C | Comparative example |
| 104 | 120 | A | A | This invention |
| 105 | 125 | A | A | This invention |
| 106 | 135 | B | A | This invention |
| 107 | 130 | B | A | This invention |
| 108 | 128 | A | A | This invention |
| 109 | 131 | A | A | This invention |

As is clear from the results in Table 1, each of the Samples 101 and 102 prepared by using the organic-solvent-based materials, exhibited lower relative transfer density.

In the Sample 103, it is found that the relative transfer density was improved. However, the light fastness was deteriorated.

Further, it can be seen that all of the Samples 104 to 109 exhibited high relative transfer density and high sensitivity. Moreover, in the Samples 104 to 109, it is understood that the loss of image definition were hardly generated and the light fastness was excellent.

As described above, it was possible to obtain the heat-sensitive transfer image-receiving sheet of the present invention having high sensitivity and excellent image preservability, in which the image-receiving sheet comprises the polymer containing a repeating unit derived from the monomer represented by formula (1).

Having described our invention as related to the present embodiments, it is our intention that the invention not be limited by any of the details of the description, unless otherwise specified, but rather be construed broadly within its spirit and scope as set out in the accompanying claims.

What we claim is:

1. A heat-sensitive transfer image-receiving sheet provided with at least one receptor layer on a support,
   wherein the heat-sensitive transfer image-receiving sheet has a function of receiving dyes transferred from an ink sheet, and
   wherein the receptor layer comprises a receptor polymer capable of being dyed and containing a repeating unit derived from a monomer represented by formula (1) and a repeating unit derived from a monomer selected from the group consisting of unsaturated nitriles, styrene and styrene compounds (provided that the receptor polymer capable of being dyed is not a latex polymer),

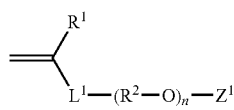

Formula (1)

wherein, $R^1$ represents a hydrogen atom, a halogen atom or a methyl group; $L^1$ represents a divalent linking group; $R^2$ represents an alkylene group having 1 to 5 carbon atoms which may be further substituted; n represents an integer of 1 to 40; $Z^1$ represents a hydrogen atom or a linear, branched or cyclic aliphatic hydrocarbon group having 1 to 30 carbon atoms which may be further substituted; and when n is 2 or more, $R^2$s may be the same or different.

2. The heat-sensitive transfer image-receiving sheet according to claim 1, wherein the monomer represented by formula (1) is a monomer represented by formula (2),

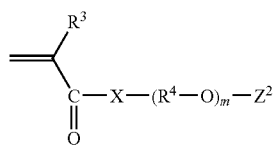

Formula (2)

wherein, $R^3$ represents a hydrogen atom, a halogen atom, or a methyl group; X represents an oxygen atom, a sulfur atom, or —N(Rc)- (in which Rc represents a hydrogen atom, an alkyl group having 1 to 8 carbon atoms or a cycloalkyl group, and the alkyl group and the cycloalkyl group may be further substituted); $R^4$ represents an alkylene group having 1 to 5 carbon atoms which may be further substituted; m represents an integer of 1 to 40; $Z^2$ represents a hydrogen atom or a linear, branched or cyclic aliphatic hydrocarbon group having 1 to 30 carbon atoms which may be further substituted; and when m is 2 or more, $R^4$s may be the same or different.

3. The heat-sensitive transfer image-receiving sheet according to claim 1, wherein the monomer represented by formula (1) is a monomer represented by formula (3),

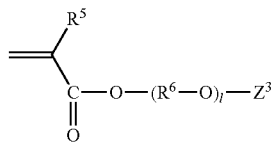

Formula (3)

wherein, $R^5$ represents a hydrogen atom, a halogen atom or a methyl group; $R^6$ represents an alkylene group having 2 to 4 carbon atoms which may be further substituted; l represents an integer of 1 to 40; $Z^3$ represents a hydrogen atom or a linear, branched or cyclic aliphatic hydrocarbon group having 1 to 20 carbon atoms which may be further substituted; and when l is 2 or more, $R^6$s may be the same or different.

4. The heat-sensitive transfer image-receiving sheet according to claim 1, wherein the receptor polymer is a copolymer containing, as essential copolymer components, a unit derived from a nitrile-series monomer, a unit derived from an aromatic vinyl monomer and a unit derived from a (meth)acrylate.

5. The heat-sensitive transfer image-receiving sheet according to claim 1, wherein a heat-insulation layer containing hollow particles is provided between the support and the receptor layer.

6. The heat-sensitive transfer image-receiving sheet according to claim 1, wherein the receptor polymer capable of being dyed has three or more polymer units.

7. The heat-sensitive transfer image-receiving sheet according to claim 1, wherein the receptor polymer capable of being dyed has four or more polymer units.

8. The heat-sensitive transfer image-receiving sheet according to claim 1, wherein the receptor polymer capable of being dyed contains a repeating unit derived from a monomer represented by formula (1), a repeating unit derived from a monomer selected from unsaturated nitriles, and a repeating unit derived from a monomer selected from the group consisting of styrene and styrene compounds.

9. The heat-sensitive transfer image-receiving sheet according to claim 1, wherein the receptor layer further comprises a silicone oil or modified silicone oil as a releasing agent.

10. A coating composition for forming a heat-sensitive transfer image-receiving sheet provided with at least one receptor layer on a support,
    wherein the heat-sensitive transfer image-receiving sheet has a function of receiving dyes transferred from an ink sheet, and
    wherein the composition comprises a receptor polymer capable of being dyed and containing a repeating unit derived from a monomer represented by formula (1) and a repeating unit derived from a monomer selected from the group consisting of unsaturated nitriles, styrene and styrene compounds (provided that the receptor polymer capable of being dyed is not a latex polymer),

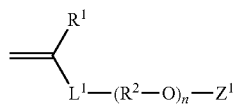

Formula (1)

wherein, $R^1$ represents a hydrogen atom, a halogen atom or a methyl group; $L^1$ represents a divalent linking group; $R^2$ represents an alkylene group having 1 to 5 carbon atoms which may be further substituted; n represents an integer of 1 to 40; $Z^1$ represents a hydrogen atom or a linear, branched or cyclic aliphatic hydrocarbon group having 1 to 30 carbon atoms which may be further substituted; and when n is 2 or more, $R^2$s may be the same or different.

11. The coating composition for forming a heat-sensitive transfer image-receiving sheet according to claim 10, wherein the monomer represented by formula (1) is a monomer represented by formula (2),

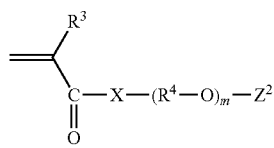

Formula (2)

wherein, $R^3$ represents a hydrogen atom, a halogen atom, or a methyl group; X represents an oxygen atom, a sulfur atom, or —N(Rc)- (in which Re represents a hydrogen atom, an alkyl group having 1 to 8 carbon atoms or a cycloalkyl group, and the alkyl group and the cycloalkyl group may be further substituted); $R^4$ represents an alkylene group having 1 to 5 carbon atoms which may be further substituted; m represents an integer of 1 to 40; $Z^2$ represents a hydrogen atom or a linear, branched or cyclic aliphatic hydrocarbon group having 1 to 30 carbon atoms which may be further substituted; and when m is 2 or more, $R^4$s may be the same or different.

12. The coating composition for forming a heat-sensitive transfer image-receiving sheet according to claim 10, wherein the monomer represented by formula (1) is a monomer represented by formula (3),

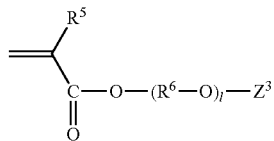

Formula (3)

wherein, $R^5$ represents a hydrogen atom, a halogen atom or a methyl group; $R^6$ represents an alkylene group having 2 to 4 carbon atoms which may be further substituted; I represents an integer of 1 to 40; $Z^3$ represents a hydrogen atom or a linear, branched or cyclic aliphatic hydrocarbon group having 1 to 20 carbon atoms which may be further substituted; and when I is 2 or more, $R^6$s may be the same or different.

13. The coating composition for forming a heat-sensitive transfer image-receiving sheet according to claim 10, wherein the receptor polymer is a copolymer containing, as essential copolymer components, a unit derived from a nitrile-series monomer, a unit derived from an aromatic vinyl monomer and a unit derived from a (meth)acrylate.

14. The coating composition according to claim 10, wherein the receptor polymer capable of being dyed has three or more polymer units.

15. The coating composition according to claim 10, wherein the receptor polymer capable of being dyed has four or more polymer units.

16. The coating composition according to claim 10, wherein the receptor polymer capable of being dyed contains a repeating unit derived from a monomer represented by formula (1), a repeating unit derived from a monomer selected from unsaturated nitriles, and a repeating unit derived from a monomer selected from the group consisting of styrene and styrene compounds.

17. The coating composition according to claim 10, wherein the receptor layer further comprises a silicone oil or modified silicone oil as a releasing agent.

* * * * *